(12) United States Patent
Shimazawa et al.

(10) Patent No.: US 6,591,481 B2
(45) Date of Patent: Jul. 15, 2003

(54) METHOD OF MANUFACTURING MAGNETORESISTIVE DEVICE AND METHOD OF MANUFACTURING THIN-FILM MAGNETIC HEAD

(75) Inventors: Koji Shimazawa, Tokyo (JP); Noriyuki Ito, Tokyo (JP); Koichi Terunuma, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/920,743

(22) Filed: Aug. 3, 2001

(65) Prior Publication Data

US 2002/0157238 A1 Oct. 31, 2002

(30) Foreign Application Priority Data

Apr. 25, 2001 (JP) ........................................ 2001-128486

(51) Int. Cl.⁷ ................................................ G11B 5/127
(52) U.S. Cl. ................................ 29/603.18; 29/603.16; 29/603.15; 29/603.07; 216/22
(58) Field of Search ......................... 29/603.18, 603.16, 29/603.07, 603.08, 603.13, 603.14; 216/22

(56) References Cited

U.S. PATENT DOCUMENTS

| | | | |
|---|---|---|---|
| 5,438,470 A | | 8/1995 | Ravipati et al. |
| 6,025,979 A | * | 2/2000 | Yamane et al. |
| 6,040,962 A | | 3/2000 | Kanazawa et al. |
| 6,093,444 A | * | 7/2000 | Miyauchi et al. |
| 6,141,190 A | | 10/2000 | Nakamoto et al. |
| 6,146,775 A | * | 11/2000 | Fujita et al. |

FOREIGN PATENT DOCUMENTS

| | | |
|---|---|---|
| JP | 8-45037 A | 2/1996 |
| JP | 9-282618 A | 10/1997 |
| JP | 11-31313 A | 2/1999 |
| JP | 2000-76629 A | 3/2000 |

OTHER PUBLICATIONS

"Direct Measurement of Spin–Dependent Conduction–Electron Mean Free Paths In Ferromagnetic Metals" by Gurney et al.; Physical Review Letters; vol. 71, No. 24; Dec. 13, 1993; pp. 4023–4026.

"Microstructure Process Techniques And Development Of Prototype Head With Reduced Read Core Width" by Tanaka et al.; The 9th Research Workshop of The Second Research Division of Association of Super-Advanced Electronics Technologies; Aug. 29, 2000; pp. 65–76. (with partial translation).

* cited by examiner

Primary Examiner—Ljiljana Ciric
(74) Attorney, Agent, or Firm—Oliff & Berridge PLC

(57) ABSTRACT

A magnetoresistive device comprises a magnetoresistive element, two bias field applying layers that apply a longitudinal bias magnetic field to the magnetoresistive element, and two electrode layers that are located adjacent to one of the surfaces of each of the bias field applying layers and overlap one of the surfaces of the magnetoresistive element. The magnetoresistive element incorporates a protection layer located on a soft magnetic layer. A sacrificial coating layer is formed on the protection layer. Before forming the electrode layers, the coating layer and an oxide layer, formed through natural-oxidizing part of the top surface of the coating layer, are removed through etching. After the electrode layers are formed, the portion of the protection layer located in the region between the two electrode layers is oxidized, and a high resistance layer is thereby formed.

8 Claims, 14 Drawing Sheets

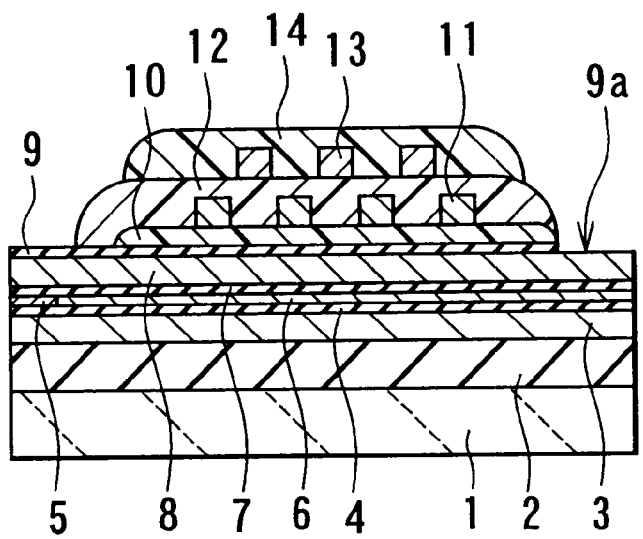
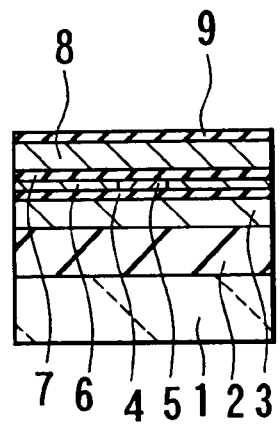
FIG. 11A　　　　　　FIG. 11B
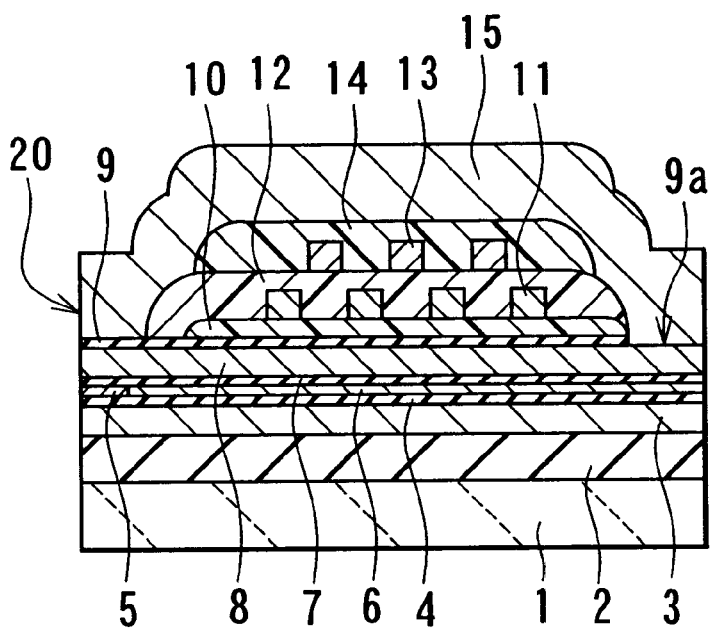
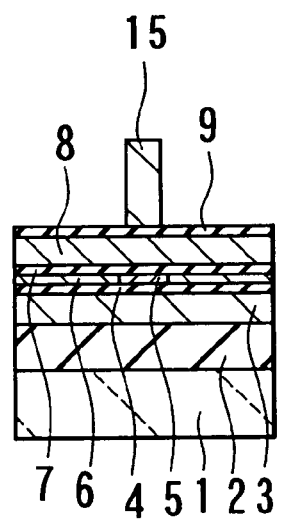
FIG. 12A　　　　　　FIG. 12B

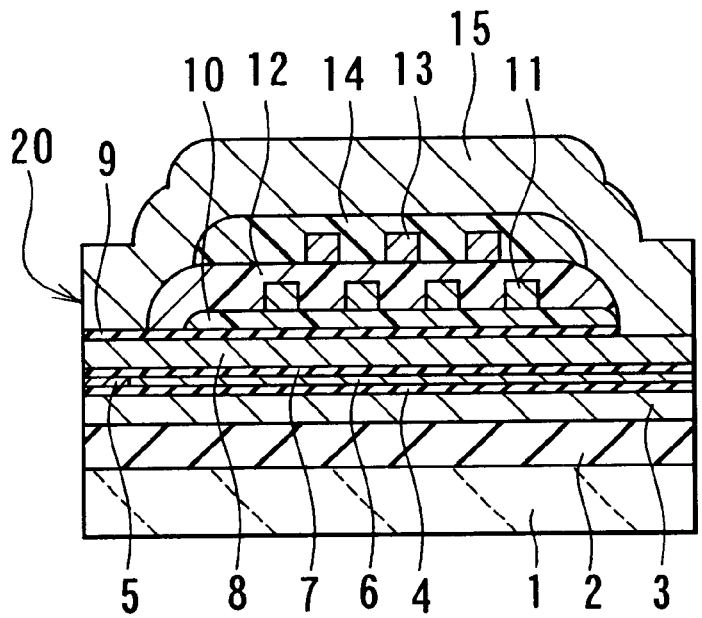
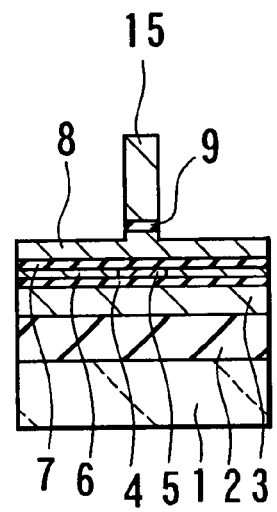
FIG. 13A
FIG. 13B
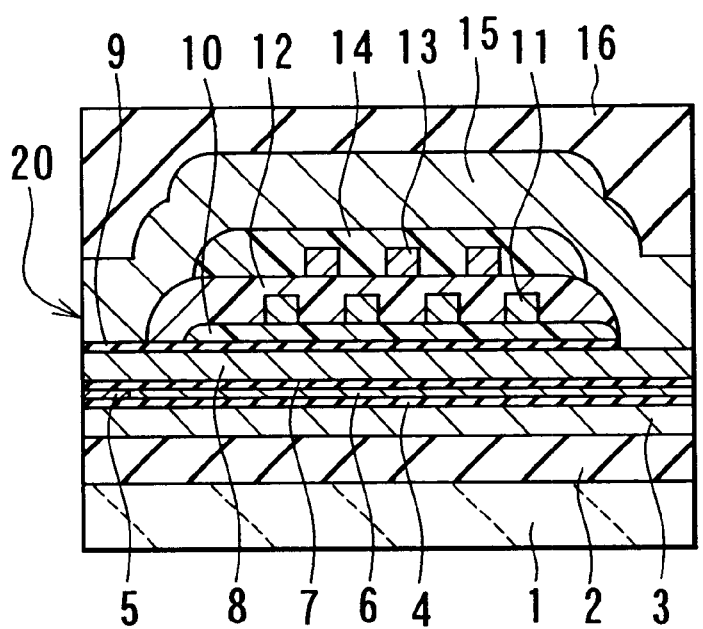
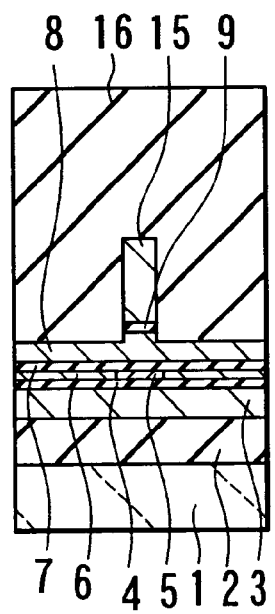
FIG. 14A
FIG. 14B

METHOD OF MANUFACTURING MAGNETORESISTIVE DEVICE AND METHOD OF MANUFACTURING THIN-FILM MAGNETIC HEAD

BACKGROUND OF THE INVENTION

1. Field of the Invention

The present invention relates to a method of manufacturing a magnetoresistive device that incorporates a magnetoresistive element, and a method of manufacturing a thin-film magnetic head that incorporates a magnetoresistive element.

2. Description of the Related Art

Performance improvements in thin-film magnetic heads have been sought as the recording density of hard disk drives has increased. Such thin-film magnetic heads include composite thin-film magnetic heads that have been widely used. A composite head is made of a layered structure including a write (recording) head having an induction-type electromagnetic transducer for writing and a read (reproducing) head having a magnetoresistive (MR) element for reading.

MR elements include: an AMR element that utilizes the anisotropic magnetoresistive effect; a GMR element that utilizes the giant magnetoresistive effect; and a TMR element that utilizes the tunnel magnetoresistive effect.

Read heads that exhibit a high sensitivity and a high output are required. An example of read heads that meet these requirements are GMR heads incorporating spin valve GMR elements. Such GMR heads have been mass-produced.

In general, the spin valve GMR element incorporates: a nonmagnetic layer having two surfaces that face toward opposite directions; a soft magnetic layer located adjacent to one of the surfaces of the nonmagnetic layer; a ferromagnetic layer located adjacent to the other one of the surfaces of the nonmagnetic layer; and an antiferromagnetic layer located adjacent to one of the surfaces of the ferromagnetic layer that is farther from the nonmagnetic layer. The soft magnetic layer is a layer in which the direction of magnetization changes in response to the signal magnetic field and is called a free layer. The ferromagnetic layer is a layer in which the direction of magnetization is fixed by the field supplied from the antiferromagnetic layer and is called a pinned layer.

Another characteristic required for the read head is a small Barkhausen noise. Barkhausen noise results from transition of a domain wall of a magnetic domain of an MR element. If Barkhausen noise occurs, an abrupt variation in output results, which induces a reduction in signal-to-noise (S/N) ratio and an increase in error rate.

To reduce Barkhausen noise, a bias magnetic field (that may be hereinafter called a longitudinal bias field) is applied to the MR element along the longitudinal direction. To apply the longitudinal bias field to the MR element, bias field applying layers may be provided on both sides of the MR element, for example. Each of the bias field applying layers is made of a hard magnetic layer or a laminate of a ferromagnetic layer and an antiferromagnetic layer, for example.

In the read head, in which the bias field applying layers are provided on both sides of the MR element, two electrode layers for feeding a current used for magnetic signal detection (that may be hereinafter called a sense current) to the MR element are located to touch the bias field applying layers.

As disclosed in Published Unexamined Japanese Patent Application Heisei 11-31313 (1999), it is known that, when the bias field applying layers are located on both sides of the MR element, regions that may be hereinafter called dead regions are created near ends of the MR element that are adjacent to the bias field applying layers. In these regions the magnetic field produced from the bias field applying layers fixes the direction of magnetization, and sensing of a signal magnetic field is thereby prevented. Such dead regions are created in the free layer of the spin valve GMR element.

Consequently, if the electrode layers are located so as not to overlap the MR element, a sense current passes through the dead regions. The output of the read head is thereby reduced.

To solve this problem, the electrode layers are located to overlap the MR element, as disclosed in Published Unexamined Japanese Patent Application Heisei 8-45037 (1996), Published Unexamined Japanese Patent Application Heisei 9-282618 (1997), Published Unexamined Japanese Patent Application Heisei 11-31313 (1999), and Published Unexamined Japanese Patent Application 2000-76629, for example.

It is possible to reduce Barkhausen noise while a reduction in output of the read head is prevented, if the read head has a structure such that the bias field applying layers are located on both sides of the MR element, and the electrode layers overlap the MR element, as described above. Such a structure is hereinafter called an overlapping electrode layer structure.

To improve the sensitivity of the read head incorporating the spin valve GMR element, a variety of improvements in spin valve film that make up the spin valve GMR element have been proposed. One of such next-generation spin valve films is a spin valve film in which a high resistance layer is located adjacent to one of the surfaces of the free layer that is farther from the nonmagnetic layer. (See Atsushi Tanaka et al., 'Microstructure Process Techniques and Development of Prototype Head with Reduced Read Core Width'. The $9^{th}$ Research Workshop of The Second Research Division of Association of Super-Advanced Electronics Technologies, Aug. 29, 2000, pp. 65–76.) The high resistance layer of the specular spin valve film reflects electrons and thereby increases the rate of change in resistance of the spin valve GMR element. The read output of the read head is thereby increased. The high resistance layer maybe made of an oxide of a metal such as Fe, Al, Ni, or Ta.

Consideration is now given to the read head having the overlapping electrode layer structure in which the GMR element incorporating the above-described specular spin valve film is located such that the pinned layer is closer to the substrate and the free layer is farther from the substrate. To fabricate this read head, if the electrode layers are formed after the high resistance layer is formed on the free layer, the high resistance layer is located between the free layer and the electrode layers. As a result, a sense current flows from the bias field applying layers to an end of the GMR element, which results in a reduction in output of the read head and unstable operations. Therefore, to fabricate the read head that has both specular spin valve film and overlapping electrode layer structure as described above, it is necessary to adopt some method to form the high resistance layer adjacent to the free layer after the electrode layers are formed.

The following method may be taken to fabricate the read head that has both specular spin valve film and overlapping electrode layer structure.

Reference is now made to FIG. 20 to FIG. 28 to describe this method. In the method, as shown in FIG. 20, a base layer 121, an antiferromagnetic layer 122, a pinned layer 123, a nonmagnetic layer 124, a soft magnetic layer (a free layer) 125, and a protection layer 126 are formed in this order through sputtering, for example, and stacked. Each of the base layer 121 and the protection layer 126 is made of a metal material.

Next, as shown in FIG. 21, after the protection layer 126 is formed, the layers of FIG. 20 are exposed to the atmosphere, so that part of the top surface thereof is natural-oxidized and an oxide layer 140 is thereby formed.

Next, as shown in FIG. 22, a resist mask 141 is formed on the oxide layer 140 through photolithography. The resist mask 141 is used for patterning the layers from the oxide layer 140 to the pinned layer 123. Next, these layers are selectively etched through ion milling, for example, using the resist mask 141, and thereby patterned. Through this etching, part of the top surface of the antiferromagnetic layer 122 is etched, too.

Next, as shown in FIG. 23, on the antiferromagnetic layer 122, two bias field applying layers 127 are formed on both sides of the layers from the oxide layer 140 to the pinned layer 123 while the resist mask 141 is left unremoved. Each of the bias field applying layers 127 may have a structure in which a base layer 127a, a hard magnetic layer 127b and a protection layer 127c are stacked in this order.

Next, as shown in FIG. 24, the resist mask 141 is removed. The laminate in which the layers up to the bias field applying layers 127 are stacked is exposed to the atmosphere, so that part of the top surface of the protection layer 127c of each of the bias field applying layers 127 is natural-oxidized and an oxide layer 128 is thereby formed.

Next, as shown in FIG. 25, the oxide layer 140 is completely removed through dry etching. At the same time, the oxide layer 128 is removed and part of the top surface of each of the bias field applying layers 127 is removed.

Next, as shown in FIG. 26, a conductive layer 129 is formed on the bias field applying layers 127 and the protection layer 126. The conductive layer 129 is made of a material of which electrode layers 106 described later are made. The conductive layer 129 may be made up of a base layer 129a, a conductor layer 129b and a protection layer 129c that are stacked in this order.

Next, as shown in FIG. 27, a specific width of the conductive layer 129 between the two bias field applying layers 127 is etched through reactive ion etching, for example, to form a trench 130. The conductive layer 129 is divided into two by the trench 130, and the two electrode layers 106 are thus formed.

Next, as shown in FIG. 28, oxidation is performed to oxidize a portion of the protection layer 126 located in the region between the two electrode layers 106. This portion of the protection layer 126 is thereby made to have a high resistance, so that a high resistance layer 131 is formed.

Through the method including the steps shown in FIG. 20 to FIG. 28, the high resistance layer 131 is formed after the electrode layers 106 are formed.

However, the above-described method has the following problem. Through the method, the layers of FIG. 20 are exposed to the atmosphere so that part of the top surface of the protection layer 126 is natural-oxidized and the oxide layer 140 is formed. The thickness of the oxide layer 140 thus formed and the thickness of the remainder of the protection layer 126 that has not been oxidized vary, depending on the period during which the layers of FIG. 20 are exposed to the atmosphere and the temperature and humidity at which the layers are exposed. On the other hand, when etching is performed in the step shown in FIG. 25, that is, etching is performed to remove the oxide layer 140 completely, the oxide layer 140 and the protection layer 126 are etched at different etching rates. Therefore, if the thicknesses of the oxide layer 140 and the protection layer 126 vary, the thickness of the protection layer 126 that remains after the oxide layer 140 is removed varies.

When oxidation is performed in the step shown in FIG. 28, that is, oxidation is performed to oxidize the portion of the protection layer 126 located in the region between the two electrode layers 106 to form the high resistance layer 131, if the soft magnetic layer 125 is oxidized, too, a reduction in the property of the soft magnetic layer 125 results. The read output is thereby reduced. If the protection layer 126 is not fully oxidized, specular reflection of electrons in the high resistance layer 131 is not satisfactorily performed, so that it is difficult to expect an increase in read output. It is therefore desirable that only the protection layer 126 is completely oxidized through the above-mentioned oxidation.

However, if the thickness of the protection layer 126 varies, it is impossible to employ fixed conditions for the oxidation in order to completely oxidize the protection layer 126 only. If fixed conditions for the oxidation are employed, the property of the read head varies.

OBJECT AND SUMMARY OF THE INVENTION

It is an object of the invention to provide a method of manufacturing a magnetoresistive device and a method of manufacturing a thin-film magnetic head for constantly manufacturing the magnetoresistive device and thin-film magnetic head that exhibit high outputs and high operation stability.

A method of manufacturing a magnetoresistive device or a method of manufacturing a thin-film magnetic head of the invention is provided for manufacturing the magnetoresistive device or thin-film magnetic head comprising: a magnetoresistive element having two surfaces that face toward opposite directions and two side portions that face toward opposite directions; two bias field applying layers that are located adjacent to the side portions of the magnetoresistive element and apply a bias magnetic field to the magnetoresistive element; and two electrode layers that feed a current used for magnetic signal detection to the magnetoresistive element, each of the electrode layers being adjacent to one of surfaces of each of the bias field applying layers and overlapping one of the surfaces of the magnetoresistive element. The magnetoresistive element incorporates: a nonmagnetic layer having two surfaces that face toward opposite directions; a soft magnetic layer located adjacent to one of the surfaces of the nonmagnetic layer that is closer to the electrode layers; a pinned layer, located adjacent to the other one of the surfaces of the nonmagnetic layer, whose direction of magnetization is fixed; an antiferromagnetic layer located adjacent to one of surfaces of the pinned layer that is farther from the nonmagnetic layer, the antiferromagnetic layer fixing the direction of magnetization of the pinned layer; a conductive protection layer located adjacent to one of surfaces of the soft magnetic layer that is farther from the nonmagnetic layer; and a high resistance layer that is formed through increasing a resistance of a portion of the protection layer that is located in a region between the two electrode layers.

The method of manufacturing the magnetoresistive device or the method of manufacturing the thin-film magnetic head of the invention comprises the steps of: forming the antiferromagnetic layer, the pinned layer, the nonmagnetic layer, the soft magnetic layer and the protection layer that make up the magnetoresistive element, in this order, and forming a coating layer on the protection layer, the coating layer being to be removed in a later step; forming the bias field applying layers; removing the coating layer and exposing one of surfaces of the protection layer; forming the two electrode layers on the bias field applying layers such that the electrode layers overlap the one of the surfaces of the protection layer; and forming the high resistance layer by increasing the resistance of the portion of the protection layer that is located in the region between the two electrode layers, and completing the magnetoresistive element.

According to the method of manufacturing the magnetoresistive device or the method of manufacturing the thin-film magnetic head of the invention, the sacrificial coating layer is formed on the protection layer. Before forming the electrode layers, the coating layer is removed. After the electrode layers are formed, the portion of the protection layer located in the region between the two electrode layers is processed to have a high resistance, so that the high resistance layer is formed. It is thereby possible to make the thickness of the protection layer nearly uniform when the high resistance layer is formed, and to form the high resistance layer having less variations in resistive property.

According to the method of manufacturing the magnetoresistive device or the method of manufacturing the thin-film magnetic head of the invention, in the step of removing the coating layer, the coating layer may be removed by etching, and measurement may be performed to identify an element that scatters from the coating layer by etching, and a point at which etching is stopped may be controlled, based on a result of the measurement.

According to the method of manufacturing the magnetoresistive device or the method of manufacturing the thin-film magnetic head of the invention, the step of forming the electrode layers may include the steps of: forming a conductive layer on the bias field applying layers and the protection layer, the conductive layer being made of a material of which the electrode layers are made; and forming the electrode layers by etching a specific width of the conductive layer in a region between the two bias field applying layers to form a trench so that the conductive layer is divided into two by the trench.

According to the method of manufacturing the magnetoresistive device or the method of manufacturing the thin-film magnetic head of the invention, the high resistance layer may be formed through oxidizing the portion of the protection layer that is located in the region between the two electrode layers in the step of forming the high resistance layer.

Other and further objects, features and advantages of the invention will appear more fully from the following description.

BRIEF DESCRIPTION OF THE DRAWINGS

FIG. 11A and FIG. 11B are cross sections for illustrating a step of a method of manufacturing a thin-film magnetic head of the first embodiment.

FIG. 12A and FIG. 12B are cross sections for illustrating a step that follows FIG. 11A and FIG. 11B.

FIG. 13A and FIG. 13B are cross sections for illustrating a step that follows FIG. 12A and FIG. 12B.

FIG. 14A and FIG. 14B are cross sections for illustrating a step that follows FIG. 13A and FIG. 13B.

DETAILED DESCRIPTION OF THE PREFERRED EMBODIMENTS

Figure 1:
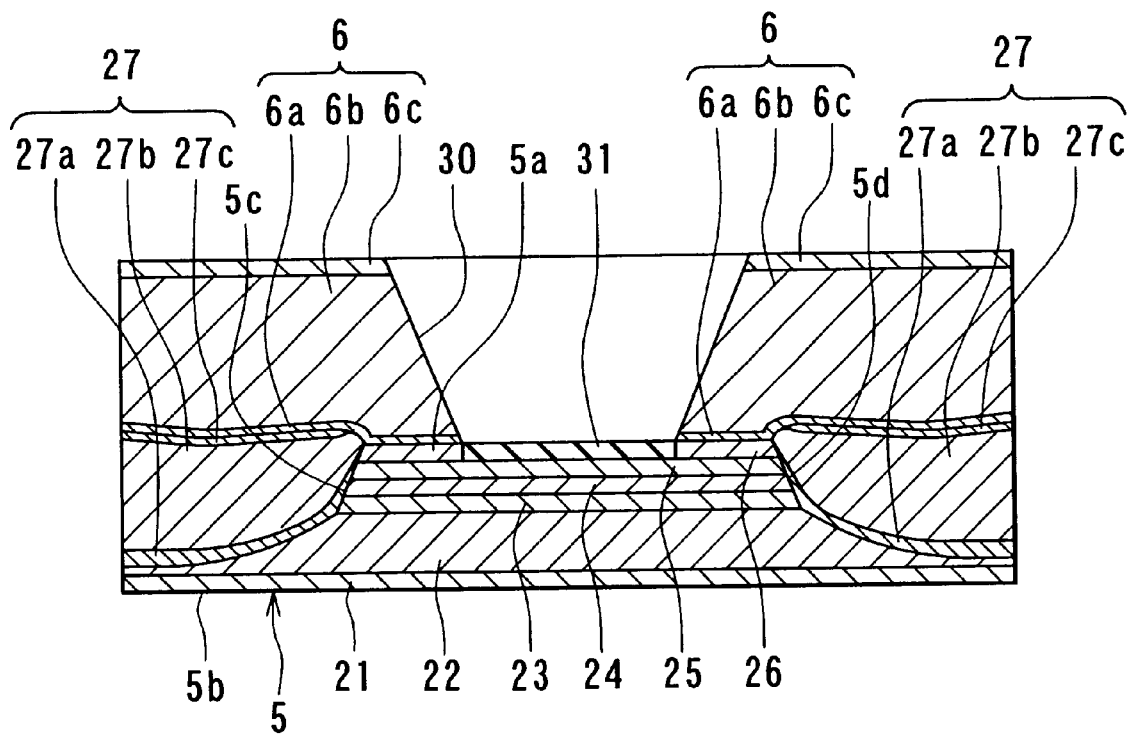
FIG. 1 is a cross section of a magnetoresistive device of a first embodiment of the invention that is parallel to the air bearing surface.

Preferred embodiments of the invention will now be described in detail with reference to the accompanying drawings.

Reference is now made to FIG. 11A to FIG. 14A and FIG. 11B to FIG. 14B to describe an outline of a method of manufacturing a thin-film magnetic head of a first embodiment of the invention. FIG. 11A to FIG. 14A are cross sections each orthogonal to the air bearing surface. FIG. 11B to FIG. 14B are cross sections of the pole portion each parallel to the air bearing surface.

In the manufacturing method, as shown in FIG. 11A and FIG. 11B, an insulating layer 2 made of an insulating material such as alumina ($Al_2O_3$) or silicon dioxide ($SiO_2$) whose thickness is 1 to 20 µm, for example, is formed through sputtering, for example, on a substrate 1 made of a ceramic material such as aluminum oxide and titanium carbide ($Al_2O_3$—TiC). On the insulating layer 2 a bottom shield layer 3 made of a magnetic material and having a thickness of 0.1 to 5 µm, for example, is formed for making a read head. The bottom shield layer 3 is made of a magnetic material such as FeAlSi, NiFe, CoFe, CoFeNi, FeN, FeZrN, FeTaN, CoZrNb, or CoZrTa. The bottom shield layer 3 is formed through sputtering or plating.

Next, on the bottom shield layer 3, a bottom shield gap film 4 made of an insulating material such as $Al_2O_3$ or $SiO_2$ and having a thickness of 10 to 200 nm, for example, is formed through sputtering, for example. On the bottom shield gap film 4, a magnetoresistive (MR) element 5 for reading having a thickness of tens of nanometers, for example, is formed through sputtering, for example. Next, although not shown, two bias field applying layers that are located adjacent to sides of the MR element 5 are formed on the bottom shield gap film 4 through sputtering, for example. The bias field applying layers apply a longitudinal bias magnetic field to the MR element 5. Next, on the bottom shield gap film 4 and the bias field applying layers, a pair of electrode layers 6 having a thickness of tens of nanometers are formed through sputtering, for example. The electrode layers 6 are electrically connected to the MR element 5. Next, a top shield gap film 7 made of an insulating material such as $Al_2O_3$ or $SiO_2$ and having a thickness of about 10 to 200 nm, for example, is formed through sputtering, for example, on the bottom shield gap film 4 and the MR element 5.

The above-mentioned layers making up the read head are patterned through the general etching method using a resist pattern, the liftoff method or the method using both etching and liftoff.

Next, on the top shield gap film 7, a top-shield-layer-cum-bottom-pole-layer (called a top shield layer in the following description) 8 is formed. The top shield layer 8 has a thickness of 0.5 to 4.0 µm, for example, and is made of a magnetic material and used for both read head and write head. The top shield layer 8 is made of a soft magnetic material such as NiFe, CoFe, CoFeNi or FeN, and formed through sputtering or plating, for example.

Next, a write gap layer 9 made of an insulating material such as $Al_2O_3$ or $SiO_2$ and having a thickness of 10 to 500 nm, for example, is formed through sputtering, for example, on the top shield layer 8. Next, a portion of the gap layer 9 located in a center portion of a thin-film coil described later is etched to form a contact hole 9a for making a magnetic path.

Next, an insulating layer 10 made of a thermoset photoresist, for example, is formed in a portion in which the thin-film coil is to be formed on the gap layer 9. Next, a first layer 11 of the thin-film coil made of a conductive material such as Cu is formed by frame plating, for example, on the insulating layer 10. An insulating layer 12 made of a thermoset photoresist, for example, is formed to cover the insulating layer 10 and the first layer 11 of the coil. Next, a second layer 13 of the thin-film coil made of a conductive material such as Cu is formed by frame plating, for example, on the insulating layer 12. An insulating layer 14 made of a thermoset photoresist, for example, is formed to cover the insulating layer 12 and the second layer 13 of the coil. The first layer 11 and the second layer 13 of the coil are connected to each other and wound around the contact hole 9a. For example, the total thickness of the first layer 11 and the second layer 13 is 2 to 5 µm and the total thickness of the insulating layers 10, 12 and 14 is 3 to 20 µm.

Next, as shown in FIG. 12A and FIG. 12B, a top pole layer 15 made of a magnetic material and having a thickness of 3 to 5 µm, for example, is formed for the write head. The top pole layer 15 extends from the air bearing surface (the medium facing surface) 20 through the top of the insulating layers 12 and 14 to the contact hole 9a. The top pole layer 15 is made of a soft magnetic material such as NiFe, CoFe, CoFeNi or FeN.

The bottom pole layer (the top shield layer 8) and the top pole layer 15 include portions that are opposed to each other and located on a side of the air bearing surface 20, the gap layer 9 being located between these portions. These portions are the pole portion of the bottom pole layer (the top shield layer 8) and the pole portion of the top pole layer 15. In this embodiment the pole portion of the top pole layer 15 has a width equal to the write track width and defines the write track width. The bottom pole layer (the top shield layer 8) and the top pole layer 15 are magnetically coupled to each other through the contact hole 9a.

Next, as shown in FIG. 13A and FIG. 13B, the gap layer 9 is selectively etched through dry etching, using the pole portion of the top pole layer 15 as a mask. This dry etching may be reactive ion etching (RIE) using a chlorine-base gas such as $BCl_2$ or $Cl_2$, or a fluorine-base gas such as $CF_4$ or $SF_6$, for example. Next, the top shield layer 8 is selectively etched by about 0.3 to 0.6 µm, for example, through argon ion milling, for example. A trim structure as shown in FIG. 13B is thus formed. The trim structure suppresses an increase in the effective track width due to expansion of a magnetic flux generated during writing in a narrow track.

Next, as shown in FIG. 14A and FIG. 14B, a protection layer 16 made of an insulating material such as $Al_2O_3$ or $SiO_2$ and having a thickness of 5 to 50 µm, for example, is formed over the entire surface through sputtering, for example. The surface of the protection layer 16 is flattened and pads (not shown) for electrodes are formed thereon. Finally, lapping of the slider including the foregoing layers is performed to form the air bearing surface 20 of the thin-film magnetic head including the write head and the read head. The thin-film magnetic head of the embodiment is thus completed.

The thin-film magnetic head of the embodiment manufactured through the foregoing steps comprises the medium facing surface (the air bearing surface 20) that faces toward a recording medium, the read head, and the write head. The read head incorporates: the MR element 5; and the bottom shield layer 3 and the top shield layer 8 for shielding the MR element 5. Portions of the bottom shield layer 3 and the top shield layer 8 that are located on a side of the air bearing surface 20 are opposed to each other, the MR element 5 being placed between these portions. The read head corresponds to the magnetoresistive device of this embodiment, too.

The write head incorporates the bottom pole layer (the top shield layer 8) and the top pole layer 15 that are magnetically coupled to each other, each of which includes at least one layer. The bottom pole layer and the top pole layer 15 include the pole portions that are opposed to each other and placed in regions on a side of the air bearing surface 20. The write head further incorporates: the write gap layer 9 placed between the pole portion of the bottom pole layer and the pole portion of the top pole layer 15; and the thin-film coil (made up of the layers 11 and 13) at least a part of which s placed between the bottom pole layer and the top pole layer 15 and insulated from the bottom pole layer and the top pole layer 15. The pole portion of the top pole layer 15 defines the write track width.

Reference is now made to FIG. 1 to describe the configuration of the read head of this embodiment, that is, the magnetoresistive device of this embodiment. FIG. 1 is a cross section of the magnetoresistive device that is parallel to the air bearing surface.

As shown in FIG. 1, the magnetoresistive device of the embodiment comprises: the MR element 5 having two surfaces 5a and 5b that face toward opposite directions and two side portions 5c and 5d that face toward opposite directions; the two bias field applying layers 27 that are located adjacent to the side portions 5c and 5d of the MR element 5 and apply a longitudinal bias field to the MR element 5; and the two electrode layers 6 that feed a sense current used for magnetic signal detection to the MR element 5, each of the electrode layers 6 being adjacent to one of the surfaces (the top surface of FIG. 1) of each of the bias field applying layers 27. Although in FIG. 1 the electrode layers 6 are located on top of the bias field applying layers 27, the electrode layers 6 are located on the bottom shield gap film 4 in the region in which the bias field applying layers 27 are not located. The magnetoresistive device is covered with the bottom shield gap film 4 and the top shield gap film 7.

According to the description of the embodiment, the structure that the two side portions of the MR element 5 face toward opposite directions' includes the case in which the side portions of the MR element 5 are parallel to each other and the case in which the side portions 5c and 5d of the MR element 5 are not parallel to each other as shown in FIG. 1.

Each of the two electrode layers 6 is located such that a portion thereof is laid over the surface 5a, that is, one of the surfaces (the top surface of FIG. 1) of the MR element 5 (that is, each of the electrode layers 6 overlaps the surface 5a). The electrode layers 6 are electrically connected to the surface 5a, and isolated from each other by the trench 30 formed between the electrode layers 6.

The MR element 5 is a spin valve GMR element incorporating a specular spin valve film. The MR element 5 includes: a nonmagnetic layer 24 having two surfaces that face toward opposite directions; a soft magnetic layer (free layer) 25 in which the direction of magnetization varies in response to the signal magnetic field supplied from the recording medium, the soft magnetic layer 25 being adjacent to one of the surfaces (the top surface of FIG. 1) of the nonmagnetic layer 24; a pinned layer 23 whose direction of magnetization is fixed, the pinned layer 23 being adjacent to the other of the surfaces (the bottom surface of FIG. 1) of the nonmagnetic layer 24; and an antiferromagnetic layer 22 that fixes the direction of magnetization of the pinned layer 23, the antiferromagnetic layer 22 being adjacent to one of the surfaces of the pinned layer 23 that is farther from the nonmagnetic layer 24. The MR element 5 further incorporates: a base layer 21 adjacent to one of the surfaces of the antiferromagnetic layer 22 that is farther from the pinned layer 23; and a conductive protection layer 26 adjacent to one of the surfaces of the soft magnetic layer 25 that is farther from the nonmagnetic layer 24. In the MR element 5 of the embodiment, as thus described, the soft magnetic layer 25 is closer to the surface 5a of the MR element 5 than the antiferromagnetic layer 22.

The MR element 5 further incorporates the high resistance layer 31 that is formed through increasing the resistance of a part of or the entire top surface of the portion of the protection layer 26 that is located in the region between the two electrode layers 6. The high resistance layer 31 is provided for specular-reflecting electrons and thereby increasing the rate of change in resistance of the MR element 5.

According to the embodiment, the antiferromagnetic layer 22 has an area greater than that of each of the pinned layer 23, the nonmagnetic layer 24 and the soft magnetic layer 25. The bias field applying layers 27 are located between the antiferromagnetic layer 22 and the electrode layers 6.

According to the description of the embodiment, the expression 'adjacent' includes the case in which two layers directly touch each other and the case in which two layers are next to each other while a bonding layer is located between the two layers.

The base layer 21 has a thickness of 2 to 6 nm, for example, and is made of Ta or NiCr, for example.

The antiferromagnetic layer 22 has a thickness of 5 to 30 nm, for example, and may be made of an antiferromagnetic material including Mn and at least one element $M_{II}$ among the group consisting of Pt, Ru, Rh, Pd, Ni, Au, Ag, Cu, Ir, Cr and Fe. The proportion of Mn preferably falls within the range of 35 to 95 atomic % inclusive. The proportion of the other element $M_{II}$ preferably falls within the range of 5 to 65 atomic % inclusive. Types of antiferromagnetic material include a non-heat-induced antiferromagnetic material that exhibits antiferromagnetism without any heat treatment and that induces an exchange coupling magnetic field between a ferromagnetic material and itself. Another type of antiferromagnetic material is a heat-induced antiferromagnetic material that exhibits antiferromagnetism when heat treatment is given. The antiferromagnetic layer 22 may be made of either of these types.

The non-heat-induced antiferromagnetic material includes an Mn alloy that has a γ phase, such as RuRhMn, FeMn, or IrMn. The heat-induced antiferromagnetic material includes an Mn alloy that has a regular crystal structure, such as PtMn, NiMn, or PtRhMn.

The direction of magnetization is fixed in the pinned layer 23, due to the exchange coupling at the interface between antiferromagnetic layer 22 and the pinned layer 23. The pinned layer 23 may have a structure in which a first ferromagnetic layer, a coupling layer and a second ferromagnetic layer are stacked in this order on the antiferromagnetic layer 22. The first and second ferromagnetic layers may be made of a ferromagnetic material including at least Co among the group consisting of Co and Fe. In particular, it is preferred that the (111) plane of this ferromagnetic material is oriented along the direction in which the layers are stacked. The total thickness of the two ferromagnetic layers is 1.5 to 5 nm, for example. The two ferromagnetic layers are antiferromagnetic-coupled to each other and the directions of magnetization thereof are fixed to opposite directions.

The coupling layer of the pinned layer 23 has a thickness of 0.2 to 1.2 nm, for example, and may be made of a nonmagnetic material including at least one element among the group consisting of Ru, Rh, Ir, Re, Cr and Zr. The coupling layer is provided for creating antiferromagnetic exchange coupling between the first and second ferromagnetic layers, and fixing the magnetizations of these layers in opposite directions. The magnetizations of the first and second ferromagnetic layers in opposite directions include not only the case in which there is a difference of 180 degrees between these directions of magnetizations, but also the case in which there is a difference of 180±20 degrees between them.

The second ferromagnetic layer of the pinned layer 23 may contain a high resistance layer inside the ferromagnetic layer that has magnetism and an electric resistance greater than the other part. This high resistance layer is provided for reflecting at least part of the electrons so as to limit the movement of the electrons and thereby increasing the rate of change in resistance of the MR element 5. It is preferred that the high resistance layer inside the ferromagnetic layer has a thickness of 0.3 to 1 nm, and includes at least one of an oxide, a nitride, and a nitride oxide, which is magnetically stable and capable of reducing variation in output. This high resistance layer may be formed through oxidizing, nitriding, or both oxidizing and nitriding part of the material making the other part of the second ferromagnetic layer.

The nonmagnetic layer 24 has a thickness of 1.0 to 3.0 nm, for example, and may be made of a nonmagnetic conductive material that includes 80 weight % or greater of at least one element among the group consisting of Cu, Au and Ag.

The soft magnetic layer 25 has a thickness of 1.0 to 8.0 nm, for example, and may be made up of a single layer or two layers or more. An example in which the soft magnetic layer 25 is made up of two soft magnetic layers will now be given. One of the two layers that is closer to the nonmagnetic layer 24 is called a first soft magnetic layer. The other one that is closer to the protection layer 26 is called a second soft magnetic layer.

The first soft magnetic layer has a thickness of 0.5 to 3 nm, for example, and may be made of a magnetic material including at least Co among the group consisting of Ni, Co, and Fe. To be specific, the first soft magnetic layer is preferably made of $Co_xFe_yNi_{100-(x+y)}$ in which the (111) plane is oriented along the direction in which the layers are stacked. In the formula, x and y fall within the ranges of $70 \leq x \leq 100$ and $0 \leq y \leq 25$, respectively, in atomic percent.

The second soft magnetic layer has a thickness of 0.5 to 8 nm, for example, and may be made of a magnetic material including at least Ni among the group consisting of Ni, Co, Fe, Ta, Cr, Rh, Mo and Nb. To be specific, the second soft magnetic layer is preferably made of $[Ni_xCo_yFe_{100-(x+y)}]_{100-z}M_{Iz}$. $M_I$ represents at least one of Ta, Cr, Rh, Mo and Nb. In the formula, x, y and z fall within the ranges of $75 \leq x \leq 90$, $0 \leq y \leq 15$, and $0 \leq z \leq 15$, respectively, in atomic percent.

The protection layer 26 has a thickness of 1 to 10 nm, for example, and may be made of any metal such as Al, Au, Ag, Cu, Ta, NiCr, Ru, Rh, Ir, Pt, Mo, V, an NiFe alloy, a PtMn alloy, Fe, Co, or Ni. In this embodiment the protection layer 26 is made of a Ta layer having a thickness of 3 nm, for example.

The bias field applying layers 27 are made up of hard magnetic layers (hard magnets) or a laminate of a ferromagnetic layer and an antiferromagnetic layer, for example. FIG. 1 illustrates an example of the configuration of the bias field applying layers 27 each of which incorporates a hard magnetic layer. Each of the bias field applying layers 27 of this example has a structure in which the following layers are stacked one by one: a base layer 27a made of a laminate of a Ta layer and a TiW layer, for example; a hard magnetic layer 27b made of CoPt or CoCrPt, for example; and a protection layer 27c made of Ta, for example. For example, the Ta layer of the base layer 27a is 3-nm thick, the TiW layer of the base layer 27a is 7-nm thick, the hard magnetic layer 27b is 60-nm thick, and the protection layer 27c is 1.5-nm thick.

Each of the electrode layers 6 may be made up of a base layer 6a made of Ta, a conductor layer 6b made of Au, and a protection layer 6c made of Ta that are stacked in this order. For example, the base layer 6a is 0.5-nm thick, the conductor layer 6b is 50-nm thick, and the protection layer 6c is 7-nm thick.

Figure 2:
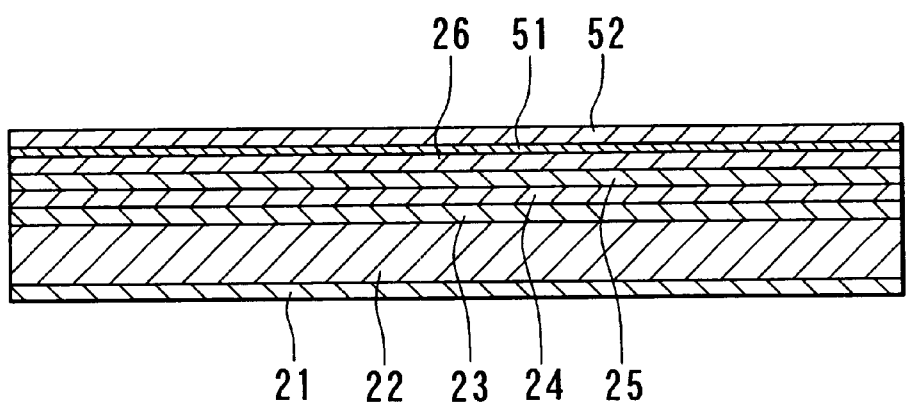
FIG. 2 is a cross section for illustrating a step of a method of manufacturing the magnetoresistive device of the first embodiment.

Reference is now made to FIG. 2 to FIG. 10 to describe a method of manufacturing the magnetoresistive device of the embodiment. In the method, as shown in FIG. 2, the base layer 21, the antiferromagnetic layer 22, the pinned layer 23, the nonmagnetic layer 24, the soft magnetic layer 25, the protection layer 26, a first coating layer 51 and a second coating layer 52 are formed in this order through sputtering, for example, and stacked. The base layer 21 is formed on the bottom shield gap film 4.

Examples of thicknesses and materials of the foregoing layers will now be given. The base layer 21 is a 5-nm-thick NiCr layer. The antiferromagnetic layer 22 is a 15-nm-thick PtMn layer. The pinned layer 23 has a structure in which a 1.5-nm-thick CoFe layer that is the first ferromagnetic layer, a 0.8-nm-thick Ru layer that is the coupling layer, a 1-nm-thick CoFe layer and a 2-nm-thick CoFe layer that function as the second ferromagnetic layer are stacked in this order. In the second ferromagnetic layer the oxide layer that is the high resistance layer inside the ferromagnetic layer is formed between the 1-nm-thick CoFe layer and the 2-nm-thick CoFe layer. This oxide layer is formed through oxidizing part of the 1-nm-thick CoFe layer. The nonmagnetic layer 24 is a 2.1-nm-thick Cu layer. The soft magnetic layer 25 is a laminate of a 1-nm-thick CoFe layer and a 2-nm-thick NiFe layer. The protection layer 26 is a 3-nm-thick Ta layer.

The first coating layer 51 and the second coating layer 52 are to be removed by etching in a later step. The first coating layer 51 is used to detect the point at which the etching is stopped, and made of a metal material that is different from the material of the protection layer 26. The second coating layer 52 is made of a metal material that is different from the material of the first coating layer 51. Each of the first coating layer 51 and the second coating layer 52 may be made of any metal such as Al, Au, Ag, Cu, Ta, NiCr, Ru, Rh, Ir, Pt, Mo, V, an NiFe alloy, an FeCo alloy, a PtMn alloy, Fe, Co, or Ni. In this embodiment the first coating layer 51 is made of a 1-nm-thick Cu layer and the second coating layer 52 is made of a 3-nm-thick Ta layer.

Figure 3:
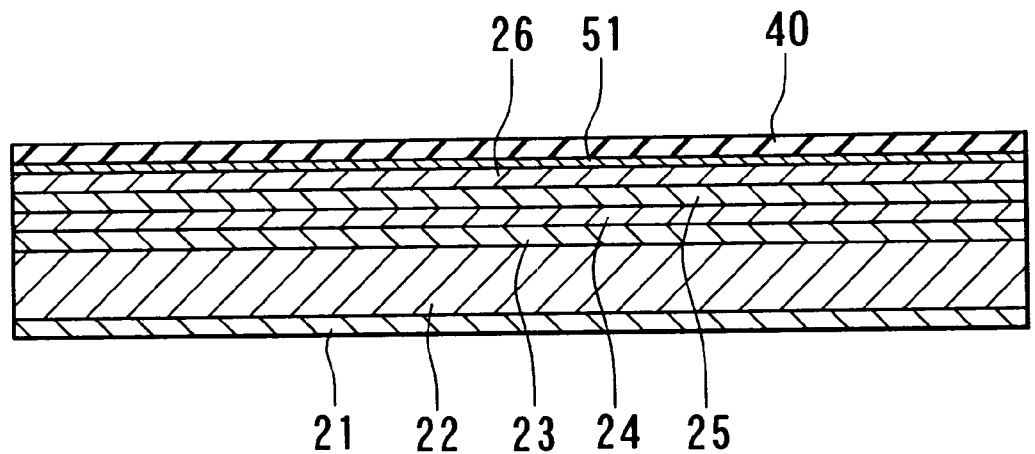
FIG. 3 is a cross section for illustrating a step that follows FIG. 2.

After the second coating layer 52 is formed, the layers of FIG. 2 is exposed to the atmosphere, so that part of the top surface of the second coating layer 52 is natural-oxidized and an oxide layer 40 is formed, as shown in FIG. 3. If the second coating layer 52 is a Ta layer having a thickness of about 3 nm, it is impossible that the first coating layer 51 is oxidized as well. Although not shown in FIG. 3, a part of the second coating layer 52 that has not been oxidized may remain between the first coating layer 51 and the oxide layer 40.

Figure 4:
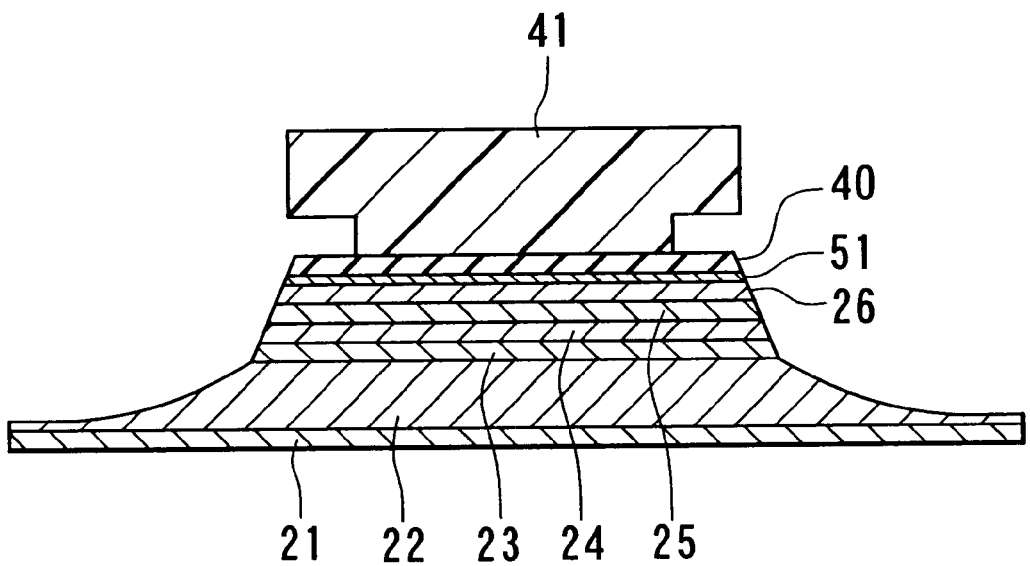
FIG. 4 is a cross section for illustrating a step that follows FIG. 3.

Next, as shown in FIG. 4, a resist mask 41 is formed on the oxide layer 40 through photolithography. The resist mask 41 is used for patterning the layers from the oxide layer 40 to the pinned layer 23. Next, these layers are selectively etched through ion milling, for example, using the resist mask 41, and thereby patterned. At the same time, part of the top surface of the antiferromagnetic layer 22 is etched, too.

Figure 5:
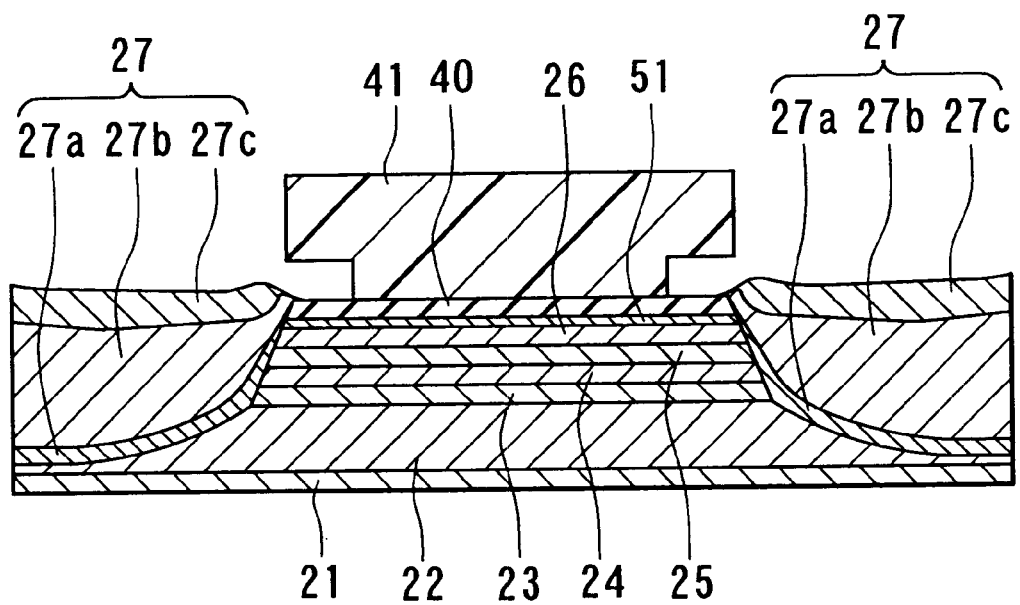
FIG. 5 is a cross section for illustrating a step that follows FIG. 4.

Next, as shown in FIG. 5, on the antiferromagnetic layer 22, the two bias field applying layers 27 are formed on both sides of the layers from the oxide layer 40 to the pinned layer 23 while the resist mask 41 is left unremoved. Each of the bias field applying layers 27 may be made up of the base layer 27a, the hard magnetic layer 27b and the protection layer 27c that are stacked in this order, for example, as described above.

Figure 6:
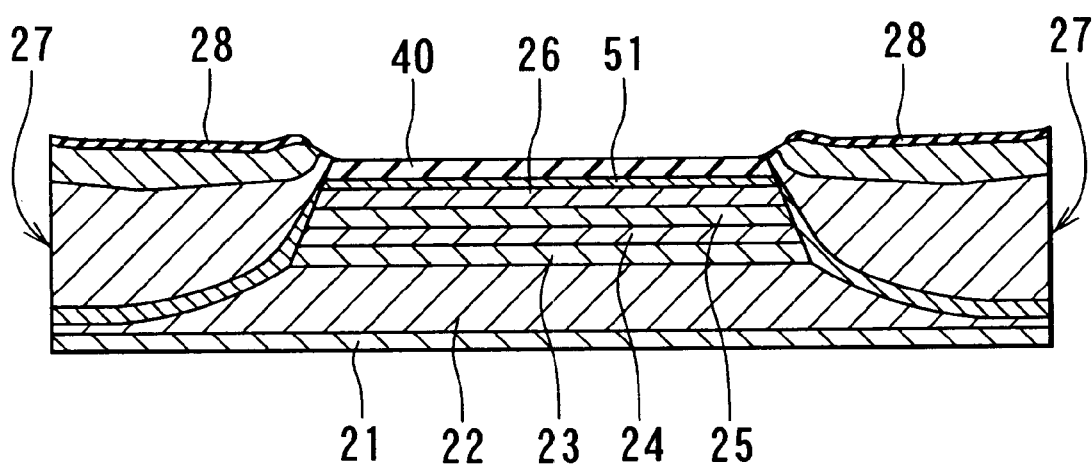
FIG. 6 is a cross section for illustrating a step that follows FIG. 5.

Next, as shown in FIG. 6, the resist mask 41 is removed. The laminate in which the layers up to the bias field applying layers 27 are formed is exposed to the atmosphere, so that part of the top surface of the protection layer 27c of each of the bias field applying layers 27 is natural-oxidized and an oxide layer 28 is formed.

Figure 7:
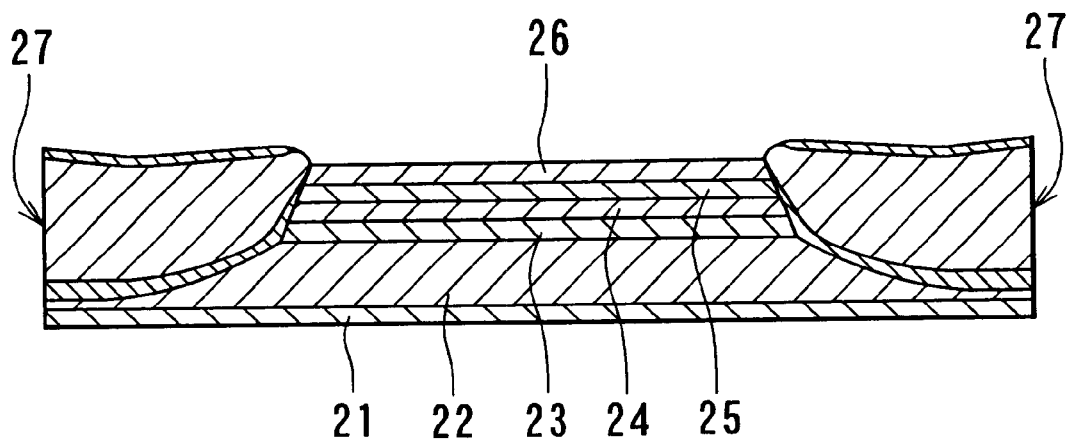
FIG. 7 is a cross section for illustrating a step that follows FIG. 6.

Next, as shown in FIG. 7, the layers from the oxide layer 40 to the first coating layer 51 are completely removed through dry etching such as ion milling. At the same time, each of the oxide layers 28 is removed and part of the top surface of each of the bias field applying layers 27 is removed.

When the layers from the oxide layer 40 to the first coating layer 51 are removed by etching in this embodiment, measurement is performed to identify the element that scatters from the first coating layer 51 by etching, and the point at which etching is stopped is controlled, based on the result of the measurement. To be specific, while measurement is performed to identify the element that scatters during etching, using an ion milling apparatus that incorporates an ultimate analyzer for analyzing an element through the use of secondary ion mass spectrometry (SIMS), for example, the layers from the oxide layer 40 to the first coating layer 51 are etched. Etching is stopped when the first coating layer 51 is no more detected. Through such etching, the protection layer 26 having a nearly uniform thickness (about 3 nm, for example) only remains on the soft magnetic layer 25, regardless of the thickness of the oxide layer 40.

Figure 8:
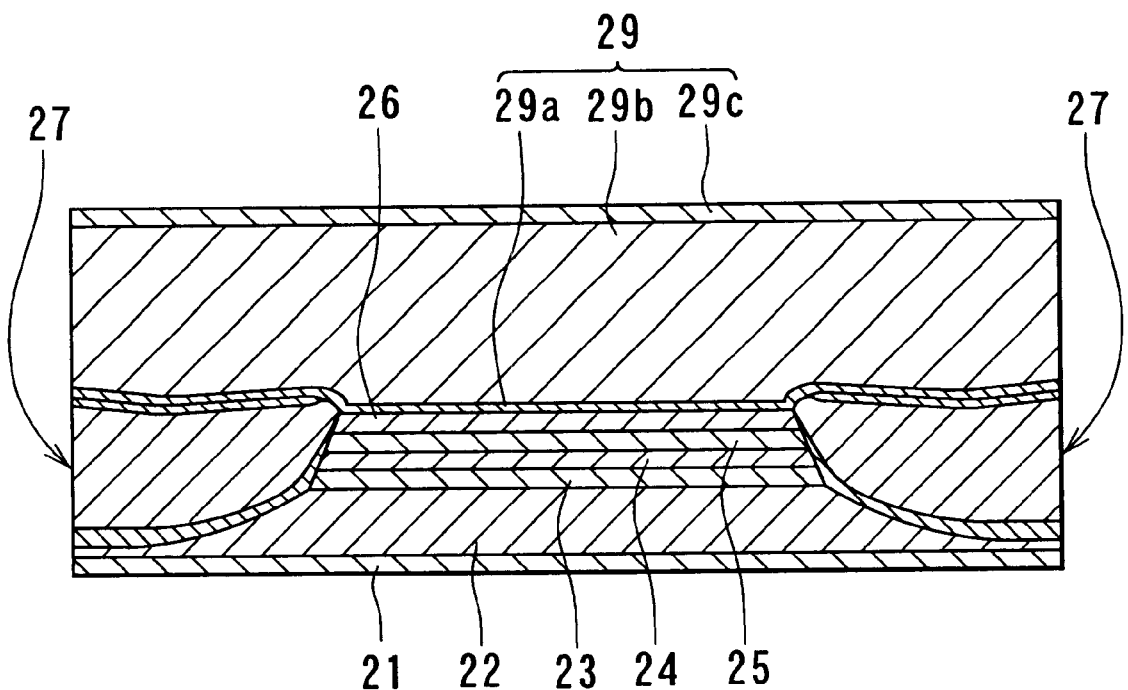
FIG. 8 is a cross section for illustrating a step that follows FIG. 7.

Next, as shown in FIG. 8, a conductive layer 29 is formed on the bias field applying layers 27 and the protection layer 26. The conductive layer 29 is made of a material of which the electrode layers 6 are made. The conductive layer 29 may be made up of a base layer 29a, a conductor layer 29b and a protection layer 29c that are stacked in this order. The materials and thicknesses of the base layer 29a, the conductor layer 29b and the protection layer 29c are similar to those of the base layer 6a, the conductor layer 6b and the protection layer 6c of each of the electrode layers 6. The conductive layer 29 is formed immediately after the etching, without exposing the layers that have received the above-described etching to the atmosphere.

Figure 9:
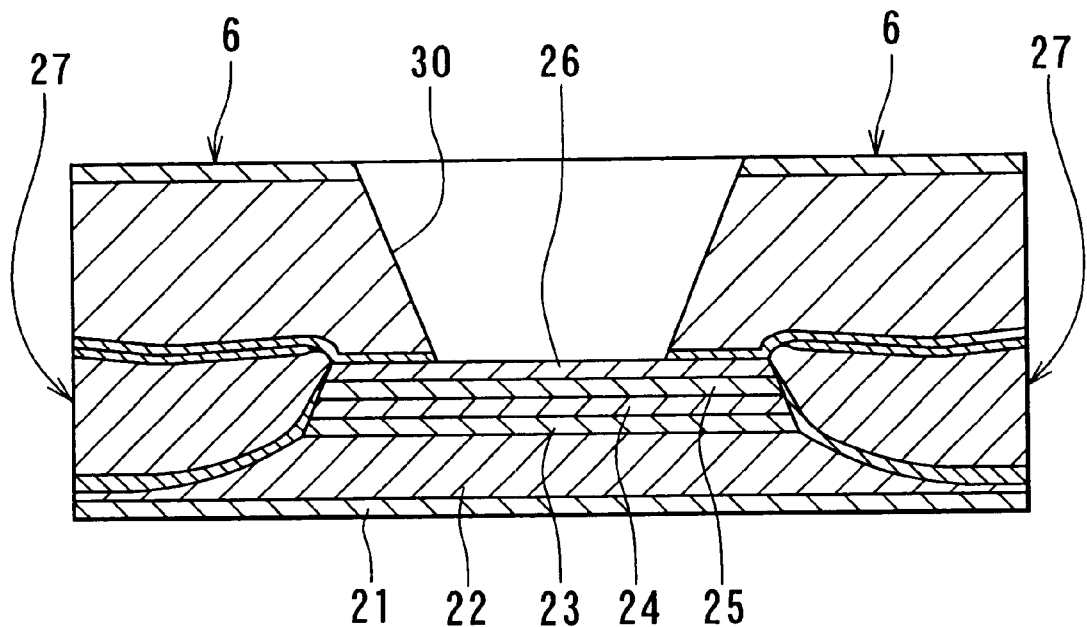
FIG. 9 is a cross section for illustrating a step that follows FIG. 8.

Next, as shown in FIG. 9, a specific width of the conductive layer 29 between the two bias field applying layers 27 is etched through reactive ion etching using a gas such as argon or oxygen, for example, to form a trench 30. The conductive layer 29 is divided into two by the trench 30, and the two electrode layers 6 are thus formed.

Figure 10:
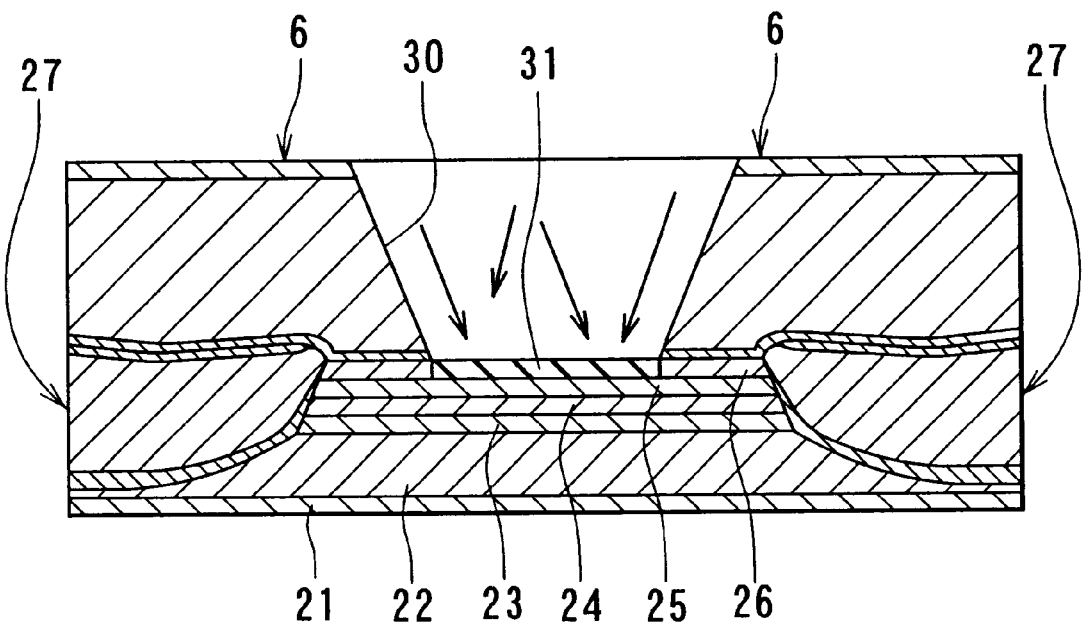
FIG. 10 is a cross section for illustrating a step that follows FIG. 9.

Next, as shown in FIG. 10, oxidation of the protection layer 26 is performed to increase the resistance of the portion of the protection layer 26 located in the region between the two electrode layers 6. A part of or the entire top surface of the portion of the protection layer 26 located in this region is thereby made to have a high resistance, so that the high resistance layer 31 is formed.

The operations of the magnetoresistive device and the thin-film magnetic head of this embodiment will now be described. The thin-film magnetic head writes data on a recording medium through the use of the write head, and reads data stored on the medium through the use of the magnetoresistive device that is the read head.

In the magnetoresistive device the direction of the bias magnetic field created by the bias field applying layers 27 is perpendicular to the direction orthogonal to the air bearing surface 20. In the MR element 5 the direction of magnetization of the soft magnetic layer 25 is equal to the direction of the bias field when no signal magnetic field is present. The direction of magnetization of the pinned layer 23 is fixed to the direction orthogonal to the air bearing surface 20.

In the MR element 5 the direction of magnetization of the soft magnetic layer 25 changes in response to the signal field supplied from the recording medium. The relative angle between the direction of magnetization of the soft magnetic layer 25 and the direction of magnetization of the pinned layer 23 is thereby changed. As a result, the resistance value of the MR element 5 is changed. The resistance value of the MR element 5 is obtained by finding the potential difference between the two electrode layers 6 when a sense current is fed to the MR element 5 from the electrode layers 6. The magnetoresistive device thus reads the data stored on the recording medium.

According to the embodiment, the bias field applying layers 27 are located on both sides of the MR element 5, so that Barkhausen noise is reduced. However, regions (hereinafter called dead regions) are created near ends of the soft magnetic layer 25 of the MR element 5 that are adjacent to the bias field applying layers 27. In these regions the magnetic field produced from the bias field applying layers 27 fixes the direction of magnetization, and sensing of a signal magnetic field is thereby prevented. The sense current that passes through the dead regions do not contribute to producing outputs of the magnetoresistive device. Therefore, the output of the magnetoresistive device is reduced when a greater sense current passes through the dead regions.

According to the embodiment, the two electrode layers 6 overlap the surface 5a of the MR element 5, so that it is possible to reduce the sense current flowing from the electrode layers 6 through the bias field applying layers 27 into the dead regions of the soft magnetic layer 25. As a result, according to the embodiment, Barkhausen noise is reduced while a reduction in output is prevented. The magnetoresistive device and the thin-film magnetic head that exhibit high outputs and high operation stability are thus implemented.

According to the embodiment, the MR element 5 includes the high resistance layer 31 that is formed through increasing the resistance of a part of or the entire top surface of the portion of the protection layer 26 located in the region between the two electrode layers 6. The high resistance layer 31 is located adjacent to one of the surfaces of the soft magnetic layer 25 that is farther from the nonmagnetic layer 24. According to the embodiment, the rate of change in resistance of the MR element 5 is thereby increased, and the output of the magnetoresistive device is more increased.

According to the method of manufacturing the magnetoresistive device and the method of manufacturing the thin-film magnetic head of the embodiment, the sacrificial coating layers 51 and 52 are formed on the protection layer 26. Before forming the electrode layers 6, the coating layers 51 and 52 and the oxide layer 40 that is formed through natural-oxidizing part of the top surface of the coating layer 52 are removed by etching. It is thereby possible to control the thickness of the protection layer 26 that remains on the soft magnetic layer 25 after the above-mentioned etching such that this thickness is nearly uniform, regardless of the thickness of the oxide layer 40.

Consequently, according to the embodiment, the thickness of the protection layer 26 is made nearly uniform when a part of the top surface of the portion of the protection layer 26 located between the two electrode layers 6 or the entire surface of this portion is oxidized to form the high resistance layer 31. As a result, it is possible to form the high resistance layer 31 having smaller variations in property while specific conditions for oxidation are determined for forming the high resistance layer 31.

The foregoing features of the embodiment allow the magnetoresistive device and the thin-film magnetic head that exhibit high outputs and high operation stability to be manufactured constantly.

According to the embodiment, in particular, when the oxide layer 40 and the coating layers 51 and 52 are removed by etching, measurement is performed to identify the element that scatters from the coating layer 51 by etching, and the point at which etching is stopped is controlled, based on the result of the measurement. It is thereby possible to control the thickness of the protection layer 26 that remains on the soft magnetic layer 25 after the above-mentioned etching such that this thickness is uniform with more accuracy. It is thus possible that the magnetoresistive device and the thin-film magnetic head that exhibit high outputs and high operation stability are manufactured more constantly.

Figure 15:
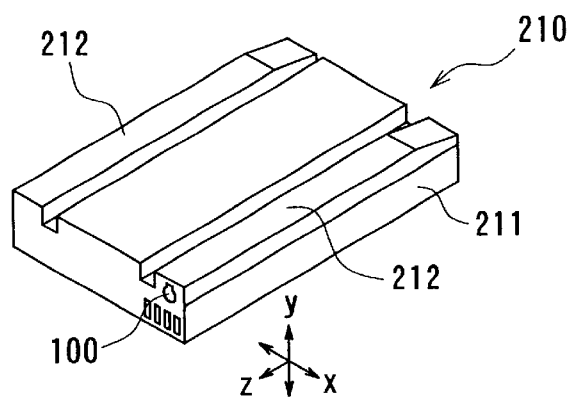
FIG. 15 is a perspective view that illustrates a slider incorporated in a head gimbal assembly of the first embodiment.

A head gimbal assembly and a hard disk drive in which the magnetoresistive device and the thin-film magnetic head of the embodiment are incorporated will now be described. Reference is made to FIG. 15 to describe a slider 210 incorporated in the head gimbal assembly. In the hard disk drive the slider 210 faces toward a hard disk platter that is a circular-plate-shaped recording medium to be rotated and driven. The slider 210 comprises a base body 211 made up mainly of the substrate 1 and the protection layer 16 of FIG. 14. The base body 211 is nearly hexahedron-shaped. One of the six surfaces of the base body 211 faces toward the disk platter. Rails 212 are formed in this one of the surfaces. A surface of each of the rails 212 functions as the air bearing surface. A tapered portion or a stepped portion is formed near the air-inflow-side end (the end located at the upper right of FIG. 15) of each of the rails 212. When the disk platter rotates in the z direction of FIG. 15, an airflow goes into the tapered portion or stepped portion and passes between the disk platter and the slider 210. A lift is thus created below the slider 210 in the y direction by the airflow and exerted on the slider 210. The slider 210 floats over the disk platter by means of the lift. The x direction of FIG. 15 is across the track of the disk platter. A thin-film magnetic head 100 of the embodiment is formed near the air-outflow-side end (the end located at the lower left of FIG. 15) of the slider 210.

Figure 16:
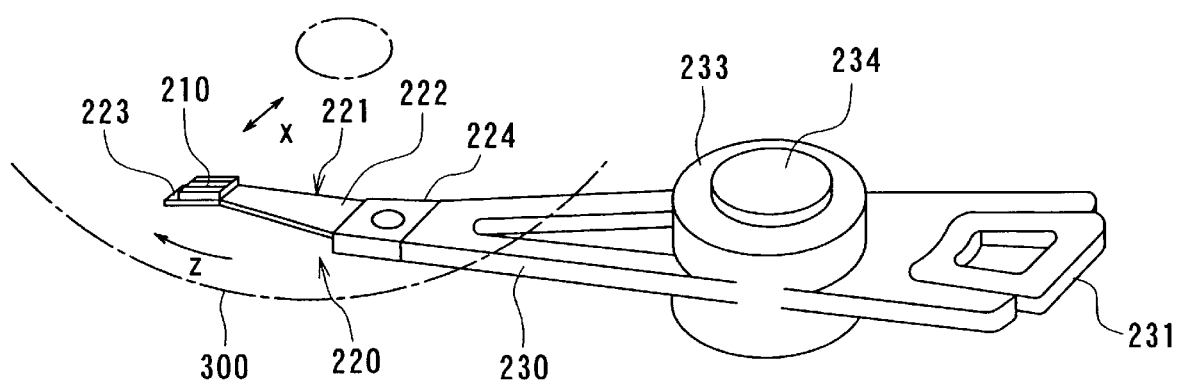
FIG. 16 is a perspective view that illustrates a head arm assembly including the head gimbal assembly of the first embodiment.

Reference is now made to FIG. 16 to describe the head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure being located at an end of the load beam 222 and giving an appropriate degree of freedom to the slider 210; and a base plate 224 located at the other end of the load beam 222. The base plate 224 is attached to an arm 230 of an actuator that moves the slider 210 along the x direction across the track of the disk platter 300. The actuator incorporates the arm 230 and a voice coil motor that drives the arm 230. A gimbal section that maintains the orientation of the slider 210 is provided in the portion of the flexure 223 on which the slider 210 is mounted.

The head gimbal assembly 220 is attached to the arm 230 of the actuator. The head gimbal assembly 220 attached to the single arm 230 is called a head arm assembly. A plurality of head gimbal assemblies 220 each attached to a plurality of arms of a carriage are called a head stack assembly.

FIG. 16 illustrates an example of the head arm assembly. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 17:
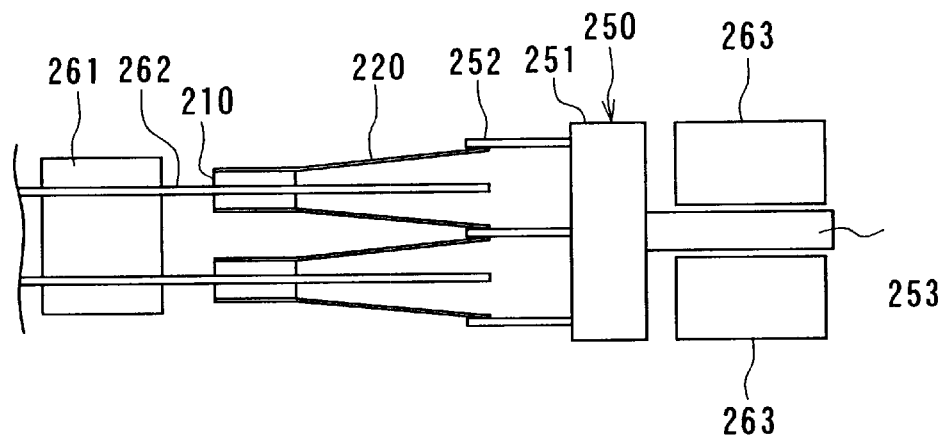
FIG. 17 illustrates the main part of the hard disk drive of the first embodiment.
Figure 18:
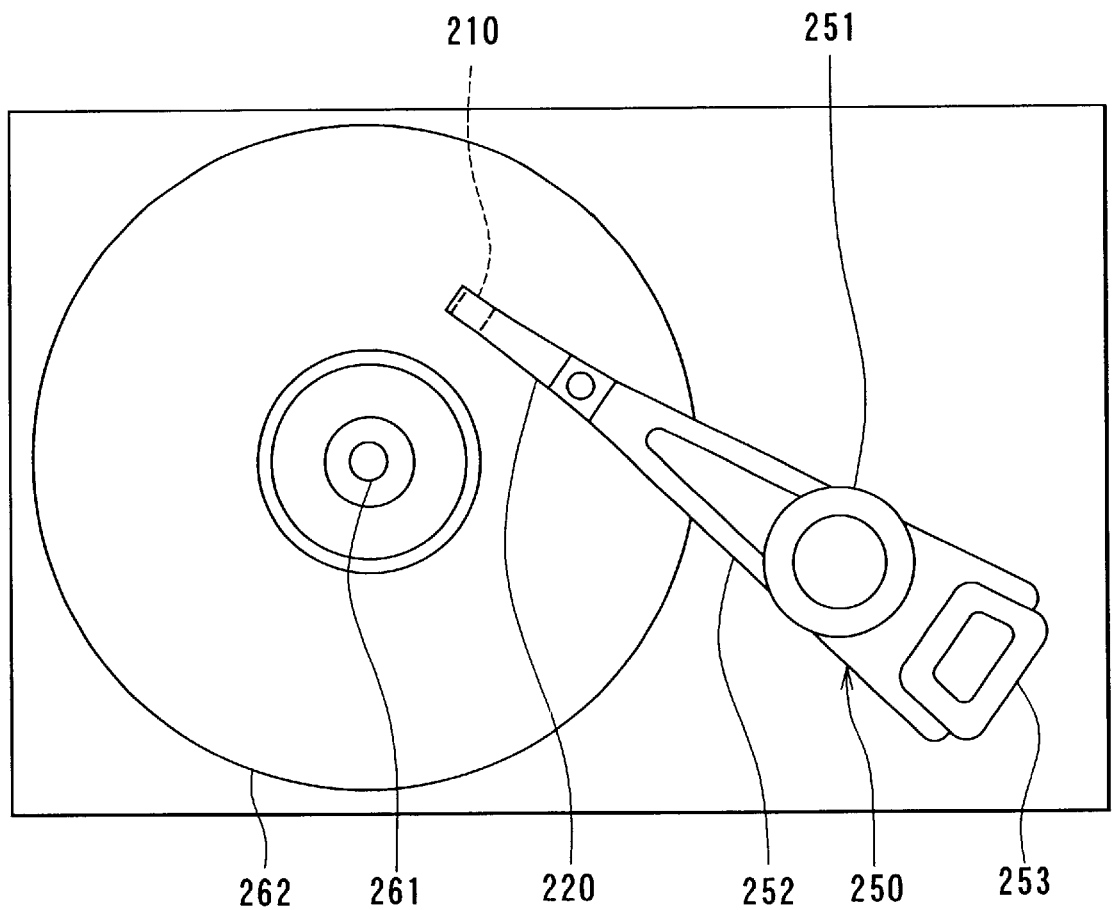
FIG. 18 is a top view of the hard disk drive of the first embodiment.

Reference is now made to FIG. 17 and FIG. 18 to describe an example of the head stack assembly and the hard disk drive of the embodiment. FIG. 17 illustrates the main part of the hard disk drive. FIG. 18 is a top view of the hard disk drive. The head stack assembly 250 incorporates a carriage 251 having a plurality of arms 251. A plurality of head gimbal assemblies 220 are each attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 210 are allocated to each of the platters 262, such that the two sliders 210 face each other with each of the platters 262 in between. The voice coil motor includes permanent magnets 263 located to face each other, the coil 253 of the head stack assembly 250 being placed between the magnets 263.

The head stack assembly 250 except the slider 210 and the actuator correspond to the alignment device of the invention and support the slider 210 and align it with respect to the hard disk platter 262.

In the hard disk drive of the embodiment the actuator moves the slider 210 across the track of the platter 262 and aligns the slider 210 with respect to the platter 262. The thin-film magnetic head incorporated in the slider 210 writes data on the platter 262 through the use of the write head and reads data stored on the platter 262 through the use of the magnetoresistive device that is the read head.

Second Embodiment

Figure 19:
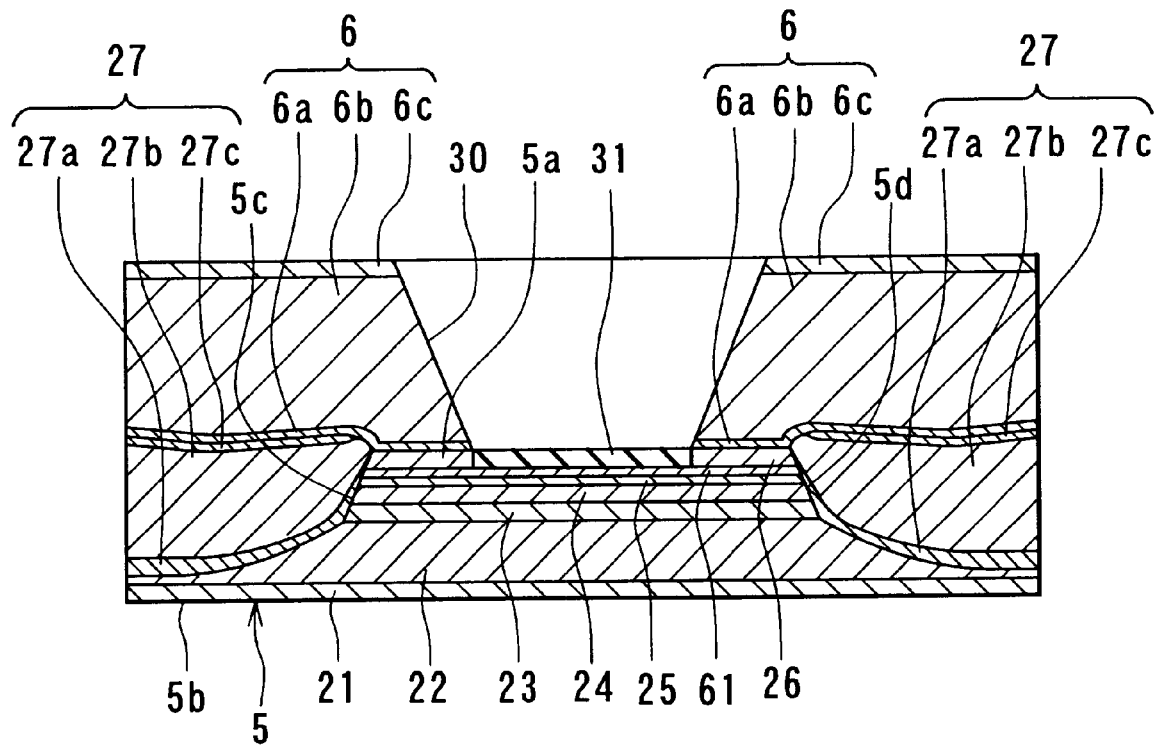
FIG. 19 is a cross section of a magnetoresistive device of a second embodiment of the invention that is parallel to the air bearing surface.
Figure 20:
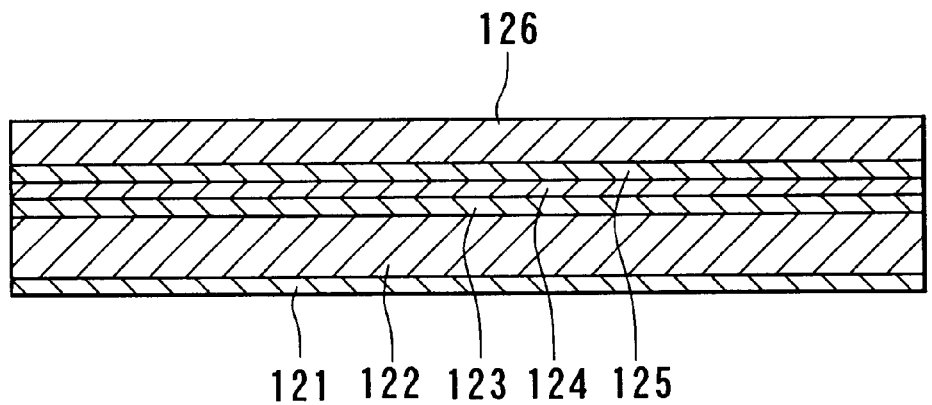
FIG. 20 is a cross section for illustrating a step of an example of the method of manufacturing the read head having the specular spin valve film and the overlapping electrode layer structure.
Figure 21:
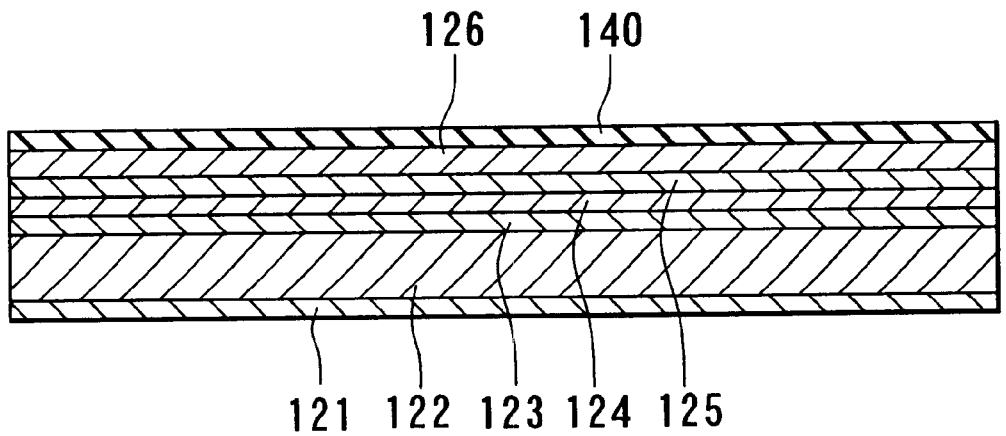
FIG. 21 is a cross section for illustrating a step that follows FIG. 20.
Figure 22:
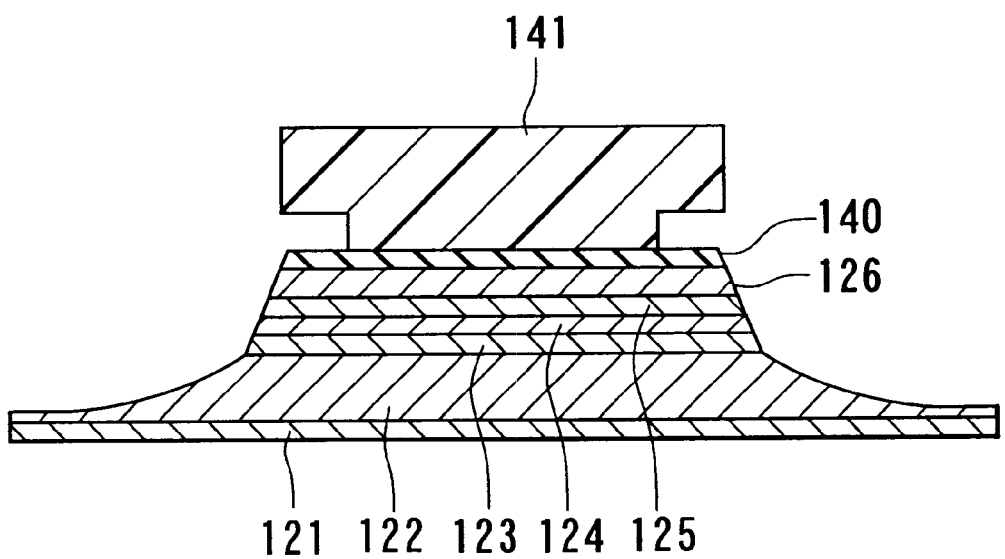
FIG. 22 is a cross section for illustrating a step that follows FIG. 21.
Figure 23:
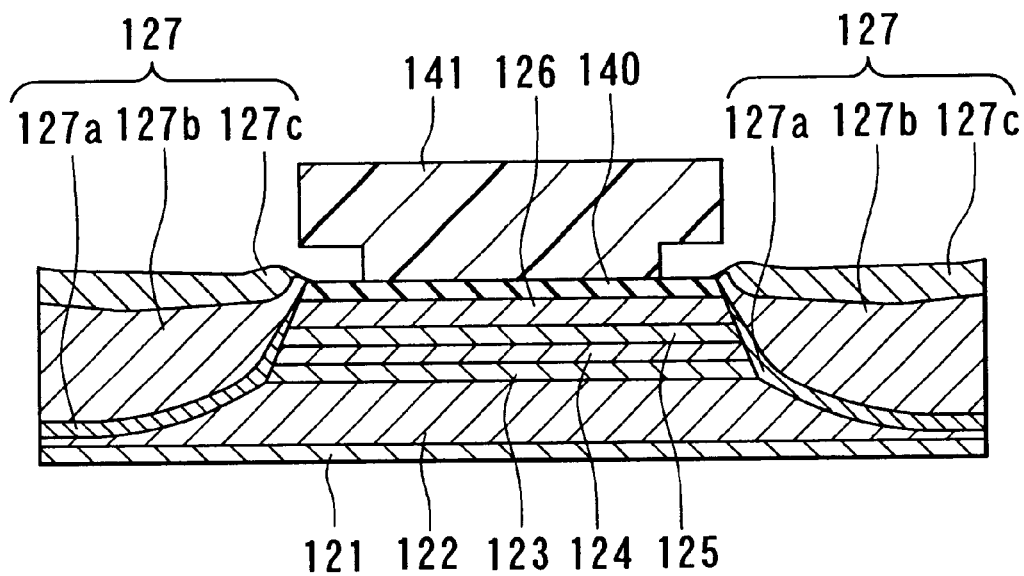
FIG. 23 is a cross section for illustrating a step that follows FIG. 22.
Figure 24:
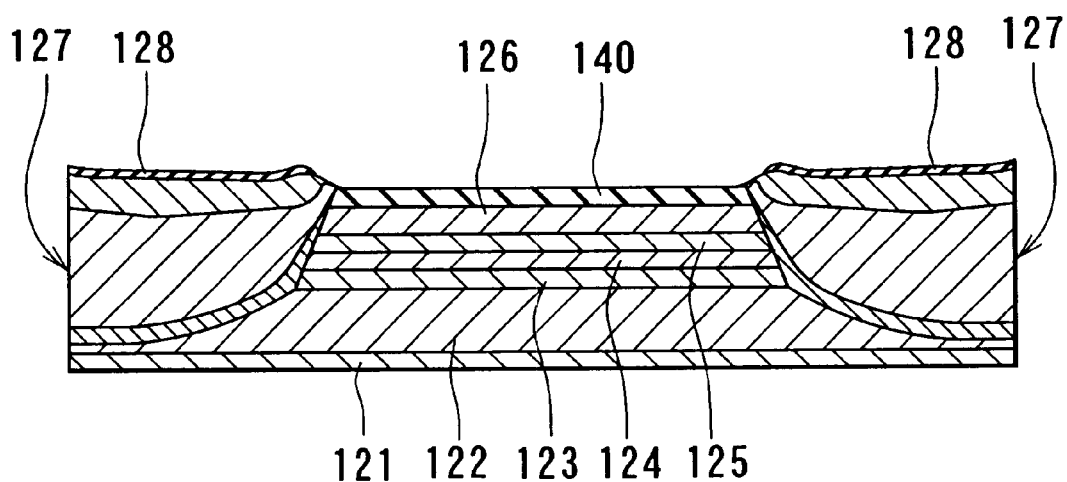
FIG. 24 is a cross section for illustrating a step that follows FIG. 23.
Figure 25:
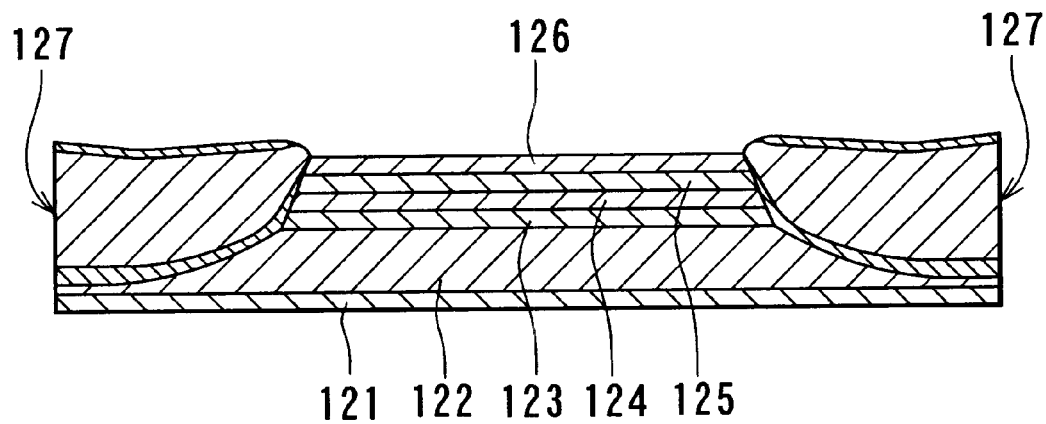
FIG. 25 is a cross section for illustrating a step that follows FIG. 24.
Figure 26:
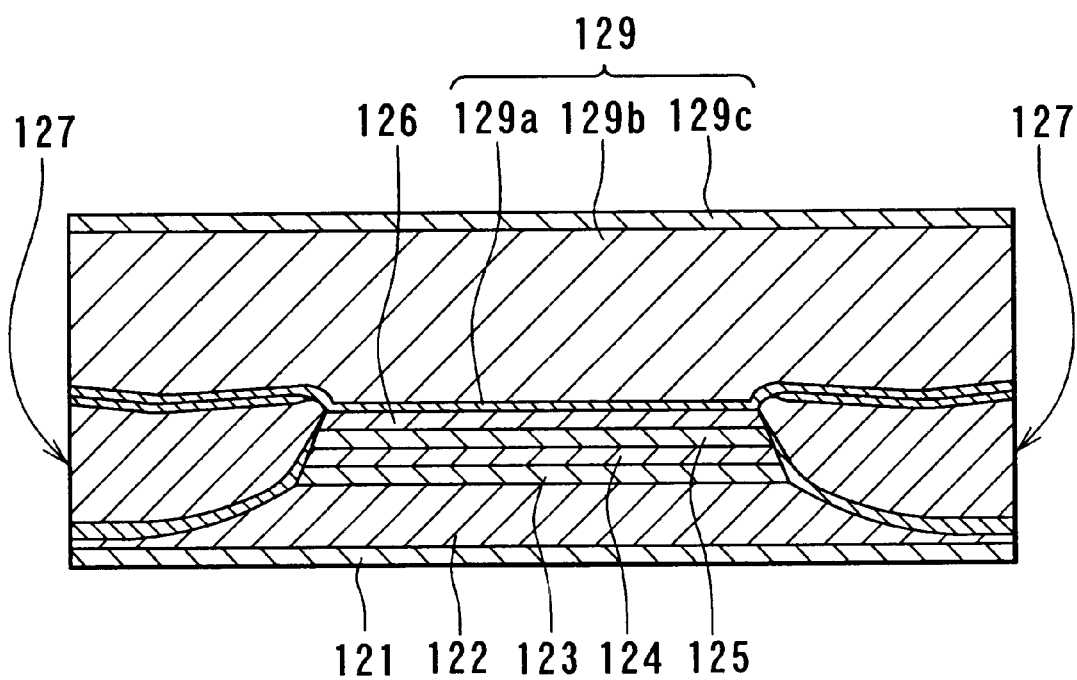
FIG. 26 is a cross section for illustrating a step that follows FIG. 25.
Figure 27:
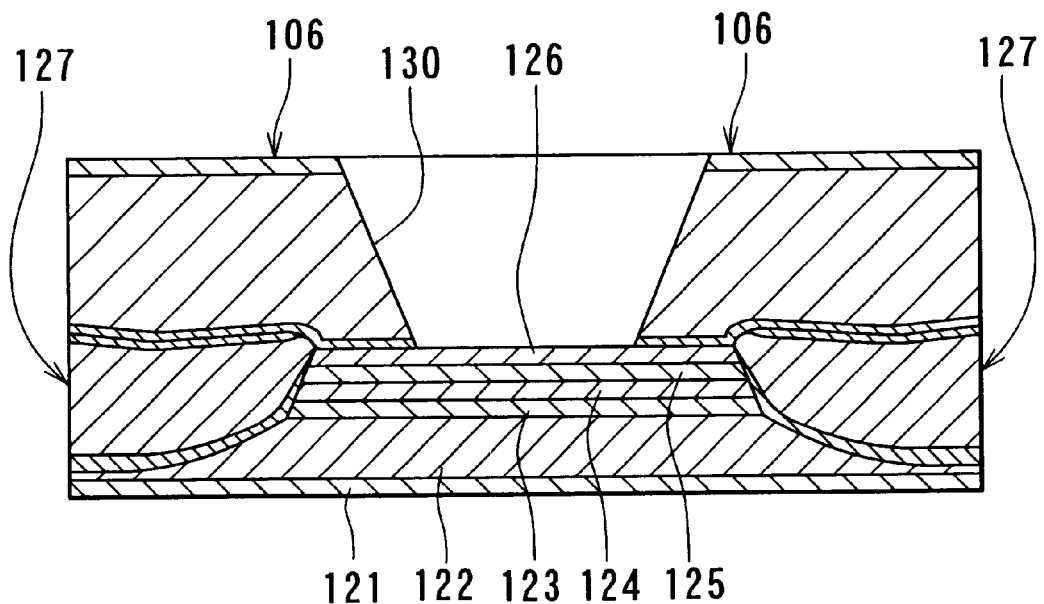
FIG. 27 is a cross section for illustrating a step that follows FIG. 26.
Figure 28:
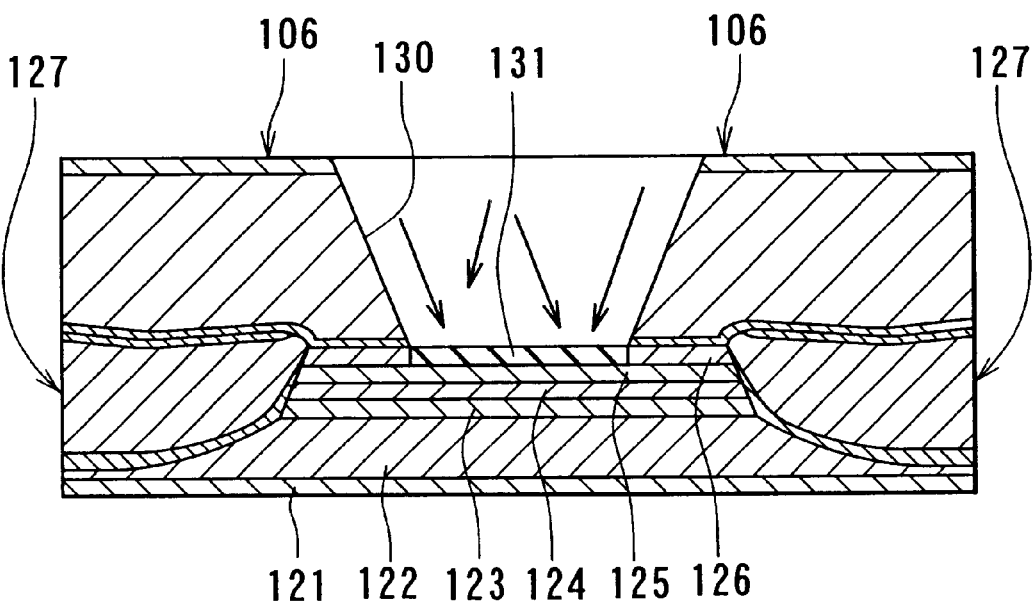
FIG. 28 is a cross section for illustrating a step that follows FIG. 27.

Reference is now made to FIG. 19 to describe a method of manufacturing a magnetoresistive device and a method of manufacturing a thin-film magnetic head of a second embodiment of the invention. FIG. 19 is a cross section of the magnetoresistive device of the embodiment that is parallel to the air bearing surface.

According to the magnetoresistive device of the embodiment, the MR element 5 includes a back layer 61 located between the soft magnetic layer 25 and the protection layer 26. The back layer 61 is made of a conductive nonmagnetic or magnetic material. The spin valve GMR element having such a configuration is disclosed, for example, in Bruce A. Gurney et al., 'Direct Measurement of Spin-Dependent Conduction-Electron Mean Free Paths in Ferromagnetic Metals', Physical Review Letters, Vol. 71, No. 24, Dec. 13, 1993, pp. 4023–4026.

The method of manufacturing the magnetoresistive device of the second embodiment is similar to that of the first embodiment except that the back layer 61 is formed on the soft magnetic layer 25, and the protection layer 26 is formed on the back layer 61 in the second embodiment.

The function of the back layer 61 of this embodiment will now be described. In the magnetoresistive device incorporating a spin valve GMR element, if the magnetic moment of the soft magnetic layer 25 is reduced, the magnetization thereof responds with high sensitivity to the signal field supplied from the recording medium. An increase in output is therefore expected. One of the methods for reducing the magnetic moment of the soft magnetic layer 25 is to reduce the thickness of the soft magnetic layer 25. However, if the thickness of the soft magnetic layer 25 is smaller than the mean free path of electrons by a specific degree, the thickness of the soft magnetic layer 25 is smaller than the depth to which the electrons enter the soft magnetic layer 25. Spin agitation is thereby created in one of the surfaces of the soft magnetic layer 25 that is farther from the nonmagnetic layer 24, so that the rate of change in resistance of the GMR element is reduced. However, if the back layer 61 is located adjacent to this surface of the soft magnetic layer 25, spin agitation in this surface is reduced, so that a reduction in the rate of change in resistance of the GMR element is prevented.

Therefore, according to the embodiment, the thickness of the soft magnetic layer 25 is reduced so that the output of the magnetoresistive device is increased. In addition, the back layer 61 is provided so that a reduction in the rate of change in resistance of the GMR element is prevented. The output of the magnetoresistive device is thus increased.

The remainder of configuration, functions and effects of the second embodiment are similar to those of the first embodiment.

The present invention is not limited to the foregoing embodiments but may be practiced in still other ways. For example, although the two layers of coating layers 51 and 52 are formed on the protection layer 26 in the embodiments, the coating layer formed on the protection layer 26 may be a single layer or three layers or more.

The measurement of the invention performed to identify the element that scatters from the coating layer by etching is not limited to the secondary ion mass spectrometry, but may be any other method.

In the foregoing embodiments, the thin-film magnetic head is disclosed, comprising the MR device for reading formed on the base body and the induction-type electromagnetic transducer for writing stacked on the MR device. Alternatively, the MR device may be stacked on the electromagnetic transducer.

If the thin-film magnetic head is dedicated to reading, the head may comprise the MR device for reading only.

The MR device of the invention is not limited to the read head of the thin-film magnetic head but may be applied to a rotational position sensor, a magnetic sensor, a current sensor, and so on.

According to the method of manufacturing the magnetoresistive device and the method of manufacturing the thin-film magnetic head of the invention described so far, the two bias field applying layers are located on both sides of the magnetoresistive element, and the two electrode layers overlap one of the surfaces of the magnetoresistive element. As a result, it is possible to implement the magnetoresistive device and the thin-film magnetic head that exhibit high outputs and high operation stability. According to the invention, the magnetoresistive element includes the high resistance layer that is formed through increasing the resistance of the portion of the protection layer located in the region between the two electrode layer, so that the output is made higher. According to the invention, the coating layer that is removed in a later step is formed on the protection layer in advance. Before forming the electrode layers, the coating layer is removed. After the electrode layers are formed, the portion of the protection layer located in the region between the two electrode layers is processed to have a high resistance, so that the high resistance layer is formed. It is thereby possible to make the thickness of the protection layer nearly uniform when the high resistance layer is formed, and to form the high resistance layer having smaller variations in property. It is thus possible to constantly manufacture the magnetoresistive device and the thin-film magnetic head that exhibit high outputs and high operation stability.

According to the method of manufacturing the magnetoresistive device and the method of manufacturing the thin-film magnetic head of the invention, in the step of removing the coating layer, the coating layer may be removed by etching, and measurement may be performed to identify the element that scatters from the coating layer by etching, and the point at which etching is stopped may be controlled, based on the result of the measurement. In this case, it is possible to control the thickness of the protection layer, when the high resistance layer is formed, such that this thickness is uniform with more accuracy. It is thus possible to more constantly manufacture the magnetoresistive device and the thin-film magnetic head that exhibit high outputs and high operation stability.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a magnetoresistive device comprising:
   a magnetoresistive element having two surfaces that face toward opposite directions and two side portions that face toward opposite directions;
   two bias field applying layers that are located adjacent to the side portions of the magnetoresistive element and apply a bias magnetic field to the magnetoresistive element; and
   two electrode layers that feed a current used for magnetic signal detection to the magnetoresistive element, each of the electrode layers being adjacent to one surface of each of the bias field applying layers and overlapping one of the surfaces of the magnetoresistive element; wherein
   the magnetoresistive element incorporates:
      a nonmagnetic layer having two surfaces that face toward opposite directions;
      a soft magnetic layer located adjacent to one of the surfaces of the nonmagnetic layer that is closer to the electrode layers;
      a pinned layer, located adjacent to the other one of the surfaces of the nonmagnetic layer, whose direction of magnetization is fixed;
      an antiferromagnetic layer located adjacent to the surface of the pinned layer that is farther from the nonmagnetic layer, the antiferromagnetic layer fixing the direction of magnetization of the pinned layer;
      a conductive protection layer located adjacent to the surface of the soft magnetic layer that is farther from the nonmagnetic layer; and a high resistance layer that is formed through increasing a resistance of a portion of the protection layer that is located in a region between the two electrode layers;

the method comprising the steps of:

sequentially forming the antiferromagnetic layer, the pinned layer, the nonmagnetic layer, the soft magnetic layer and the protection layer that make up the magnetoresistive element;

forming a sacrificial coating layer on the protection layer;

forming the bias field applying layers;

removing the coating layer and exposing one of surfaces of the protection layer;

forming the two electrode layers on the bias field applying layers such that the electrode layers overlap the one of the surfaces of the protection layer; and forming the high resistance layer by increasing the resistance of the portion of the protection layer that is located in the region between the two electrode layers.

2. The method according to claim 1, wherein the magnetoresistive device comprises a thin-film magnetic head.

3. The method according to claim 1, the step of removing the coating layer further comprising removing the coating layer by etching, wherein etching is controlled by measuring and identifying debris that scatters from the coating layer during etching.

4. The method according to claim 3, wherein the magnetoresistive device comprises a thin-film magnetic head.

5. The method according to claim 1 wherein the step of forming the electrode layers includes the steps of:

forming a conductive layer on the bias field applying layers and the protection layer, the conductive layer being made of a material of which the electrode layers are made; and forming the electrode layers by etching a specific width of the conductive layer in a region between the two bias field applying layers to form a trench so that the conductive layer is divided into two by the trench.

6. The method according to claim 5, wherein the magnetoresistive device comprises a thin-film magnetic head.

7. The method according to claim 1 wherein the high resistance layer is formed through oxidizing the portion of the protection layer that is located in the region between the two electrode layers in the step of forming the high resistance layer.

8. The method according to claim 7, wherein the magnetoresistive device comprises a thin-film magnetic head.

* * * * *